United States Patent
Yamamoto et al.

(10) Patent No.: US 11,387,449 B2
(45) Date of Patent: Jul. 12, 2022

(54) NEGATIVE ELECTRODE ACTIVE MATERIAL, NEGATIVE ELECTRODE, AND BATTERY

(71) Applicant: NIPPON STEEL CORPORATION, Tokyo (JP)

(72) Inventors: Sukeyoshi Yamamoto, Tokyo (JP); Tatsuo Nagata, Tokyo (JP); Koji Moriguchi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 386 days.

(21) Appl. No.: 16/631,077

(22) PCT Filed: Jul. 17, 2018

(86) PCT No.: PCT/JP2018/026762
§ 371 (c)(1),
(2) Date: Jan. 14, 2020

(87) PCT Pub. No.: WO2019/017349
PCT Pub. Date: Jan. 24, 2019

(65) Prior Publication Data
US 2020/0152980 A1 May 14, 2020

(30) Foreign Application Priority Data
Jul. 18, 2017 (JP) .............................. JP2017-138675

(51) Int. Cl.
*H01M 4/38* (2006.01)
*H01M 4/485* (2010.01)
(Continued)

(52) U.S. Cl.
CPC ........... *H01M 4/386* (2013.01); *C22C 1/0425* (2013.01); *C22C 9/00* (2013.01); *C22C 9/02* (2013.01);
(Continued)

(58) Field of Classification Search
CPC ...... H01M 4/386; H01M 4/387; H01M 4/485; H01M 4/505; H01M 4/525; H01M 2004/027; C22C 1/0425
See application file for complete search history.

(56) References Cited

U.S. PATENT DOCUMENTS

2013/0316238 A1* 11/2013 Nishimura ................ C22C 5/06
429/219
2014/0370386 A1* 12/2014 Hirono .................. H01M 4/386
429/223
(Continued)

FOREIGN PATENT DOCUMENTS

WO 2013141230 A1 9/2013

OTHER PUBLICATIONS

Liu et al., Journal of Electronic Materials, 2001, vol. 30, No. 9, p. 1093-1103.
(Continued)

*Primary Examiner* — Matthew J Merkling
(74) *Attorney, Agent, or Firm* — Greer Burns & Crain Ltd.

(57) ABSTRACT

The negative electrode active material according to the present embodiment includes alloy particle containing an alloy component and oxygen of 0.50 to 3.00 mass %. The alloy component contains Sn: 13.0 to 40.0 at % and Si: 6.0 to 40.0 at %. The alloy particle contains: one or two phases selected from a $D0_3$ phase in which the Si content is from 0 to 5.0 at % and a δ phase in which the Si content is from 0 to 5.0 at %; one or two phases selected from an ε phase in which the Si content is from 0 to 5.0 at % and an η' phase in which the Si content is from 0 to 5.0 at %; and an SiOx phase. The alloy particle has, in an X-ray diffraction profile, a peak having a largest integrated diffraction intensity in a range of 42.0 to 44.0 degrees of a diffraction angle 2θ.

18 Claims, 12 Drawing Sheets

(51) Int. Cl.
*H01M 4/505* (2010.01)
*H01M 4/525* (2010.01)
*C22C 1/04* (2006.01)
*C22C 9/00* (2006.01)
*H01M 4/134* (2010.01)
*C22C 9/10* (2006.01)
*H01M 4/02* (2006.01)
*C22C 9/02* (2006.01)

(52) U.S. Cl.
CPC .............. *C22C 9/10* (2013.01); *H01M 4/134* (2013.01); *H01M 4/387* (2013.01); *H01M 4/485* (2013.01); *H01M 4/505* (2013.01); *H01M 4/525* (2013.01); *H01M 2004/027* (2013.01)

(56) References Cited

U.S. PATENT DOCUMENTS

| | | | |
|---|---|---|---|
| 2015/0200392 A1* | 7/2015 | Yamamoto | C22C 30/04 |
| | | | 420/587 |
| 2016/0285076 A1* | 9/2016 | Yamamoto | H01M 4/131 |
| 2018/0323439 A1* | 11/2018 | Kimura | H01M 4/525 |
| 2020/0266430 A1* | 8/2020 | Yamamoto | C22C 9/02 |
| 2020/0388824 A1* | 12/2020 | Sachdev | H01M 10/0525 |

OTHER PUBLICATIONS

P. Villars, Pearson's Handbook Desk Edition Crystallographic Data for Intermetallic Phases vol. 2, Apr. 1997, p. 1593-1594.
Mois I. Aroyo, International Tables for Crystallography, 6th Edition, vol. A, Space-Group Symmetry, 2016.

* cited by examiner

NEGATIVE ELECTRODE ACTIVE MATERIAL, NEGATIVE ELECTRODE, AND BATTERY

This is a National Phase Application filed under 35 U.S.C. § 371, of International Application No. PCT/JP2018/026762, filed Jul. 17, 2018, the contents of which are incorporated by reference.

TECHNICAL FIELD

The present invention relates to a negative electrode active material, a negative electrode and a battery.

BACKGROUND ART

Recently, small electronic appliances such as home video cameras, notebook PCs, and smartphones have come into widespread use, and there is a demand to attain a higher capacity and a longer service life of batteries.

Further, due to the widespread use of hybrid vehicles, plug-in hybrid vehicles, and electric vehicles, there is also a demand to make batteries compact.

At present, graphite-based negative electrode active materials are utilized for lithium ion batteries. However, in the case of graphite-based negative electrode active materials, limits exist with respect to lengthening of the service life and compactness.

Accordingly, alloy-based negative electrode active materials that have a higher capacity than graphite-based negative electrode active materials have gained attention. Silicon (Si)-based negative electrode active materials and tin (Sn)-based negative electrode active materials are known as alloy-based negative electrode active materials. Various studies have been conducted on the aforementioned alloy-based negative electrode active materials to realize practical application of lithium ion batteries that have a more compact size and a long service life.

However, an alloy-based negative electrode active material repeatedly undergoes large expansions and contractions at the time of charging/discharging. For that reason, the capacity of the alloy-based negative electrode active material is prone to deteriorate. For example, the volume expansion coefficient of graphite associated with charging is about 12%. In contrast, the volume expansion coefficient of an Si simple substance or an Sn simple substance associated with charging is about 400%. For this reason, if a negative electrode plate of Si simple substance or Sn simple substance is repeatedly subjected to charging and discharging, significant expansion and contraction will occur. In such a case, cracking is caused in a negative electrode compound which is applied on the current collector of the negative electrode plate. Consequently, the capacity of the negative electrode plate rapidly decreases. This is chiefly caused by the fact that some of the negative electrode active material peels off due to volumetric expansion and contraction, and as a result the negative electrode plate loses electron conductivity.

Porous silicon particles disclosed in International Application Publication No. WO2013/141230 (Patent Literature 1) have continuous pores at which a plurality of silicon microparticles are joined. It is described in Patent Literature 1 that expansion/contraction changes in the silicon particles can be suppressed by these pores.

CITATION LIST

Patent Literature

Patent Literature 1: International Application Publication No. WO2013/141230

Non Patent Literature

Non Patent Literature 1: Liu et al., Journal of Electronic Materials, 2001, Vol. 30, No. 9, p. 1093-1103
Non Patent Literature 2: P. Villars, Pearson's Handbook Desk Edition Crystallographic Data for Intermetallic Phases Vol. 2, 1997/4, p. 1593-1594
Non Patent Literature 3: Mois I. Aroyo, International Tables for Crystallography, 6th Edition, Volume-A, Space-Group Symmetry, 2016

SUMMARY OF INVENTION

Technical Problem

However, even when the aforementioned technology is used, there are cases in which the capacity per volume and the capacity retention ratio of an alloy-based negative electrode active material are not sufficiently obtained.

It is an objective of the present invention to provide a negative electrode active material which is excellent in capacity per volume and capacity retention ratio, a negative electrode that uses the negative electrode active material, and a battery.

Solution to Problem

A negative electrode active material according to the present embodiment includes an alloy particle. The alloy particle contains an alloy component and oxygen. The alloy component contains, in atomic composition percentage excluding oxygen, Sn: 13.0 to 40.0 at % and Si: 6.0 to 40.0 at %, with the balance being Cu and impurities. The alloy particle contains oxygen in an amount in a range of 0.50 to 3.00 mass %. The alloy particle contains: one type or two types of phase selected from a group consisting of a phase having a $DO_3$ structure in Strukturbericht notation in which an Si content is in a range of 0 to 5.0 at % and a δ phase in which an Si content is in a range of 0 to 5.0 at %; one type or two types of phase selected from a group consisting of an ε phase in which an Si content is in a range of 0 to 5.0 at % and an η' phase in which an Si content is in a range of 0 to 5.0 at %; and an SiOx phase (x=0.50 to 1.70). The alloy particle has, in an X-ray diffraction profile, a peak having a largest integrated diffraction intensity in a range of 42.0 to 44.0 degrees of a diffraction angle 2θ. A half-width of the aforementioned peak is in a range of 0.15 to 2.5 degrees.

A negative electrode according to the present embodiment includes the aforementioned negative electrode active material. A battery according to the present embodiment includes the aforementioned negative electrode.

Advantageous Effects of Invention

The negative electrode active material according to the present embodiment is excellent in capacity per volume and capacity retention ratio.

DESCRIPTION OF EMBODIMENTS

Figure 1:
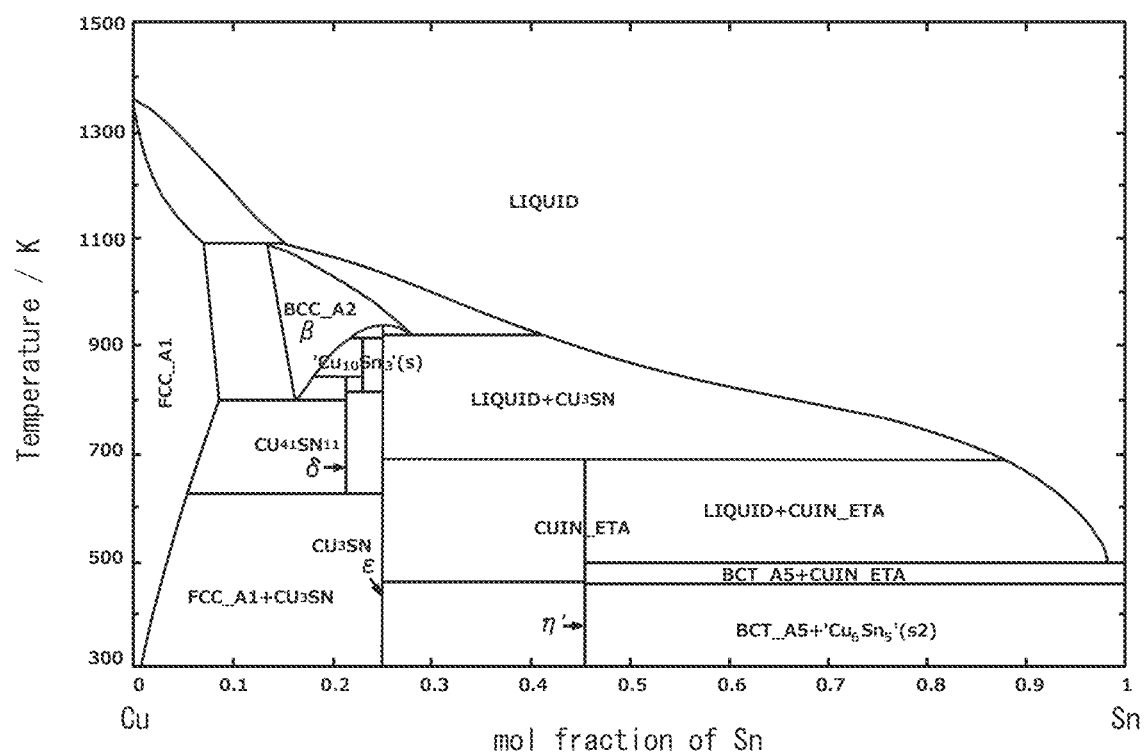
FIG. 1 is a Cu—Sn binary computational phase diagram obtained by thermodynamic calculation.

The present inventors conducted investigations and studies regarding the capacity per volume and capacity retention ratio of negative electrode active materials. As a result, the present inventors obtained the following findings.

If a negative electrode active material includes an alloy particle that contains an alloy component (Cu, Sn and Si), the capacity per volume of the negative electrode active material increases. In an epsilon phase (ε phase) and an eta-prime phase (η' phase) that appear as Cu—Sn alloy phases, a reversible capacitance caused by storage of lithium ions is large. Therefore, if the alloy particle contains an ε phase and an η' phase, the capacity per unit of the negative electrode active material increases further. However, because the capacitance of the ε phase and the η' phase is large, the degree of expansion/contraction accompanying occlusion and release of lithium ions (charging and discharging) is large. Therefore, if the alloy particle contains the ε phase and the η' phase as a single phase, the capacity retention ratio of the negative electrode active material decreases.

The present inventors discovered that if one type or two types of phase selected from a group consisting of an ε phase and an η' phase, and one type or two types of phase selected from a group consisting of a phase having a D0₃ structure and a delta phase (δ phase) that appear as other phases of a Cu—Sn alloy form a composite micro-structure in the alloy particle, the capacity retention ratio of the negative electrode active material increases. Although the reason has not been determined, it is presumed that this is because if the phase having a D0₃ structure and/or the δ phase form a composite micro-structure with the ε phase and/or the η' phase, expansion and contraction of the ε phase and the η' phase are suppressed. Accordingly, if the D0₃ phase and/or the δ phase and the ε phase and/or the η' phase form a composite micro-structure in the alloy particle, both the capacity per volume and the capacity retention ratio of the negative electrode active material can be increased.

If the alloy particle has a peak that has a largest integrated diffraction intensity (hereunder, referred to as "most intense diffraction line peak") in a range of 42.0 to 44.0 degrees of a diffraction angle 2θ in an X-ray diffraction profile, the alloy particle contains one type or two types of phase selected from a group consisting of a phase having a D0₃ structure and a δ phase, and one type or two types of phase selected from a group consisting of an ε phase and an η' phase. Further, if a half-width of the aforementioned peak is in the range of 0.15 to 2.50 degrees, the size of a crystallite diameter of the phase having a D0₃ structure, the δ phase, the ε phase and the η' phase in the alloy particle is appropriate. In this case, a storage site of lithium ions appropriately exists, and it is difficult for lithium ions to stabilize at a crystallite boundary region. As a result, an excellent discharge capacity and capacity retention ratio are easily obtained.

The present inventors also discovered that by subjecting alloy particles to mechanical alloying processing, an SiOx phase is generated as a new constituent phase of the alloy particle. In the SiOx phase, a reversible capacitance caused by storage of lithium ions is large. Therefore, if the alloy particle contains an SiOx phase, the capacity per volume of the negative electrode active material increases further. In addition, it is surmised that expansion/contraction of the SiOx phase is suppressed by the SiOx phase forming a composite micro-structure together with a phase having a D0₃ structure and/or the δ phase, and the ε phase and/or the η' phase. As a result, the capacity retention ratio of the negative electrode active material increases.

A negative electrode active material according to the present embodiment that was completed based on the above findings includes an alloy particle. The alloy particle contains an alloy component and oxygen. The alloy component contains, in atomic composition percentage excluding oxygen, Sn: 13.0 to 40.0 at % and Si: 6.0 to 40.0 at %, with the balance being Cu and impurities. The alloy particle contains oxygen in an amount in a range of 0.50 to 3.00 mass %. The alloy particle contains: one type or two types of phase selected from a group consisting of a phase having a D0₃ structure in Strukturbericht notation in which an Si content is in a range of 0 to 5.0 at % and a δ phase in which an Si content is in a range of 0 to 5.0 at %; one type or two types of phase selected from a group consisting of an ε phase in which an Si content is in a range of 0 to 5.0 at % and an η' phase in which an Si content is in a range of 0 to 5.0 at %; and an SiOx phase (x=0.50 to 1.70). The alloy particle has, in an X-ray diffraction profile, a peak having a largest integrated diffraction intensity in a range of 42.0 to 44.0 degrees of a diffraction angle 2θ. A half-width of the aforementioned peak is in a range of 0.15 to 2.50 degrees.

The negative electrode active material according to the present embodiment is excellent in capacity per volume and capacity retention ratio.

Preferably, a mean particle diameter of the aforementioned $SiO_x$ phase (x=0.50 to 1.70) is in a range of 3.0 to 90.0 nm in equivalent circular diameter.

If the mean particle diameter of the $SiO_x$ phase (x=0.50 to 1.70) is in a range of 3.0 to 90.0 nm in equivalent circular diameter, the capacity retention ratio of the negative electrode active material increases further.

The aforementioned alloy component may further contain, in place of a part of Cu, one or more types of element selected from a group consisting of Ti, V, Cr, Mn, Fe, Co, Ni, Zn, Al, B and C.

The aforementioned alloy component may further contain, in place of a part of Cu, one or more types of element selected from a group consisting of Ti: 2.00 at % or less, V: 2.00 at % or less, Cr: 2.00 at % or less, Mn: 2.00 at % or less, Fe: 2.00 at % or less, Co: 2.00 at % or less, Ni: 3.00 at % or less, Zn: 3.00 at % or less, Al: 3.00 at % or less, B: 2.00 at % or less and C: 2.00 at % or less.

A negative electrode according to the present embodiment includes the aforementioned negative electrode active material. A battery according to the present embodiment includes the aforementioned negative electrode.

The negative electrode active material according to the present embodiment is preferably a negative electrode active material for a nonaqueous electrolyte secondary battery. Hereunder, the negative electrode active material according to the present embodiment will be described in detail.

[Negative Electrode Active Material]

The negative electrode active material of the present embodiment contains an alloy particle. Preferably, the alloy particles are the main component of the negative electrode active material. Here, the term main component means that the volume ratio of the alloy particles in the negative electrode active material is more than 40 mass %. The negative electrode active material may contain a material other than alloy particles. For example, in addition to the alloy particles, the negative electrode active material may contain graphite as an active material. The content of alloy particles in the negative electrode active material is more preferably 50 mass % or more, and further preferably is 60 mass % or more.

[Alloy Particle]

The alloy particle contains an alloy component and oxygen. The alloy particle may contain impurities other than an alloy component and oxygen within a range that does not cause a deviation from the gist of the present invention. However, it is preferable that the impurities are as few as possible.

[Alloy Component]

The alloy component contains the following elements, with the balance being Cu and impurities. The symbol "at %" with respect to the alloy component means atomic composition percentage excluding oxygen.

Sn: 13.0 to 40.0 at %

Tin (Sn) increases the capacity per volume of the negative electrode active material. If the Sn content is less than 13.0 at %, formation of both an ε phase and an η' phase in the alloy particle is suppressed. In this case, the capacity per volume of the negative electrode active material decreases. On the other hand, if the Sn content is more than 40.0 at %, formation of both a $DO_3$ phase and a δ phase in the alloy particle is suppressed. In this case, the capacity retention ratio of the negative electrode active material decreases. Accordingly, the Sn content is in the range of 13.0 to 40.0 at %. A preferable lower limit of the Sn content is 13.5 at %, and more preferably is 15.5 at %. A preferable upper limit of the Sn content is 35.0 at %, and more preferably is 30.0 at %.

Si: 6.0 to 40.0 at %

Silicon (Si) increases the capacity per volume of the negative electrode active material. If the Si content is less than 6.0 at %, formation of an $SiO_x$ phase (x=0.50 to 1.70) in the alloy particle is suppressed. In this case, the capacity per volume of the negative electrode active material decreases. On the other hand, if the Si content is more than 40.0 at %, formation of a $DO_3$ phase and an δ phase in the alloy particle, or an ε phase and an η' phase in the alloy particle is suppressed. In this case, the capacity retention ratio or the initial discharge capacity of the negative electrode active material decreases. Accordingly, the Si content is in the range of 6.0 to 40.0 at %. A preferable lower limit of the Si content is 7.0 at %. A preferable upper limit of the Si content is 30.0 at %, and more preferably is 25.0 at %.

In addition to the aforementioned alloy component (Sn, Si and Cu), the alloy particle also contain oxygen.

[Oxygen]

The alloy particle contain oxygen in an amount of 0.50 to 3.00 mass %. If the oxygen content is less than 0.50 mass %, formation of an $SiO_x$ phase (x=0.50 to 1.70) in the alloy particle is suppressed. In this case, the capacity per volume of the negative electrode active material decreases. On the other hand, if the oxygen content is more than 3.00 mass %, an $SiO_x$ phase (x=0.50 to 1.70) is excessively formed in the alloy particle. In this case, the capacity retention ratio of the negative electrode active material decreases. Accordingly, the oxygen content is in the range of 0.50 to 3.00 mass %. A preferable lower limit of the oxygen content is 0.60 mass %, and more preferably is 0.70 mass %. A preferable upper limit of the oxygen content is 2.50 mass %, and more preferably is 2.00 mass %.

[Method for Measuring Oxygen Content]

The oxygen content in the alloy particle is measured by the inert gas fusion infrared absorption method. An oxygen/nitrogen analyzer with model number TC-600 manufactured by Leco Corporation is used for the measurement. Specifically, a crucible made of graphite is heated to a sufficiently high temperature in helium gas in an impulse heating furnace to remove a gas component in advance, and the alloy particle for measurement that is enclosed and hermetically sealed in a nickel capsule is then placed in the crucible and melted. The oxygen component in the alloy particle reacts with the graphite material of the crucible, and carbon monoxide gas and carbon dioxide gas are thus generated. These components (the generated carbon monoxide and carbon dioxide) in the helium carrier gas are quantitatively analyzed by an infrared absorption method. Japanese Iron and Steel Certified Reference Materials (JSS383-1, JSS389-1) are used as samples for standardization. The samples are not subjected to any particular pretreatment. Measurement is performed three times, and the arithmetic mean of the respective oxygen contents that are obtained is taken as the oxygen content in the alloy particle.

[Constituent Phases]

The alloy particle contains one type or two types of phase selected from a group consisting of a phase having a $DO_3$ structure in Strukturbericht notation (hereunder, referred to as "$DO_3$ phase") in which an Si content is in a range of 0 to 5.0 at % and a δ phase in which an Si content is in a range of 0 to 5.0 at %; one type or two types of phase selected from a group consisting of an ε phase in which an Si content is in a range of 0 to 5.0 at % and an η' phase in which an Si content is in a range of 0 to 5.0 at %; and an SiOx phase (x=0.50 to 1.70). The alloy particle may contain phases other than the D0$_3$ phase, the δ phase, the ε phase, the η' phase and the SiOx phase (x=0.50 to 1.70) within a range that does not cause a deviation from the gist of the present invention. However, it is preferable that phases other than the D0$_3$ phase, the δ phase, the ε phase, the η' phase and the SiOx phase (x=0.50 to 1.70) are as few as possible.

The D0$_3$ phase, the δ phase, the ε phase and the η' phase are described in a Cu—Sn binary computational phase diagram illustrated in Non Patent Literature 1. A Cu—Sn binary computational phase diagram obtained by use of thermodynamic database calculation software (software name: FactSage) using the same thermodynamic database (database name: SGTE11) as Non Patent Literature 1 is shown in FIG. 1. In FIG. 1, a region denoted by reference character "β" is a high-temperature stable phase with a bcc structure. Although the D0$_3$ phase is a nonequilibrium phase, the D0$_3$ phase can be obtained as a metastable phase at room temperature in a case where rapid cooling is performed from the aforementioned region β or in a case where mechanical alloying processing is performed under specific conditions that are described later, without performing rapid cooling. Although the δ phase is a high-temperature stable phase, similarly to the D0$_3$ phase, the δ phase can be obtained as a metastable phase at room temperature by rapid cooling or by mechanical alloying processing. The ε phase and the η' phase are stable equilibrium phases at room temperature. The D0$_3$ phase, the δ phase, the ε phase, the η' phase and the SiOx phase (x=0.50 to 1.70) have a property of reversibly occluding and releasing lithium ions. Therefore, these phases function as negative electrode active material. Hereunder, the D0$_3$ phase, δ phase, ε phase and η' phase are described.

[D0$_3$ Phase]

The D0$_3$ phase occludes and releases lithium ions. When the D0$_3$ phase occludes lithium ions, the crystal structure changes and a phase (occlusion phase) having a different crystal structure from the D0$_3$ phase is formed. When the occlusion phase releases lithium ions, the crystal structure changes again and returns to the D0$_3$ phase. That is, in a case where the alloy particle contains the D0$_3$ phase, the alloy particle contains the D0$_3$ phase prior to occlusion of lithium ions, and contain the occlusion phase after occlusion of lithium ions. In a case where the alloy particle repeatedly occludes and releases lithium ions, the crystal structure of the D0$_3$ phase repeatedly changes. Such changes in the crystal structure alleviate strain that arises when the alloy particle expands and contracts during charging and discharging. Consequently, the occurrence of a situation in which the alloy particle peels off from a current collector of a negative electrode due to an accumulation of strain can be suppressed. Therefore, if the alloy particle contains the D0$_3$ phase, the capacity retention ratio of the negative electrode active material increases.

Figure 2:
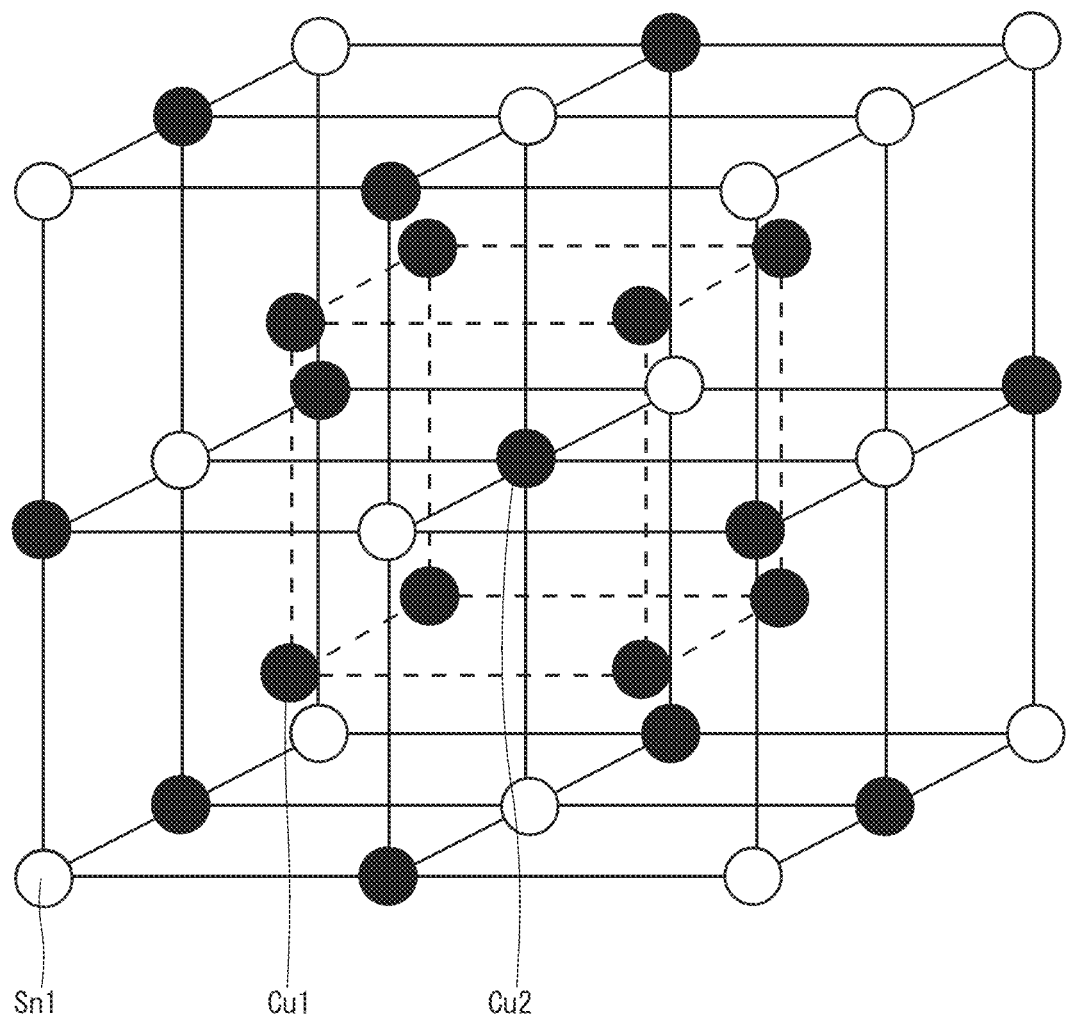
FIG. 2 is a view illustrating a crystal lattice having a D0₃ structure in Strukturbericht notation.

The D0$_3$ phase is one type of nonequilibrium phase. The D0$_3$ structure is an ordered structure as shown in FIG. 2, and is a cubic crystal. Sn is mainly located at an atomic site Sn1 shown by a white circle in FIG. 2. Cu is mainly located at atomic sites Cu1 and Cu2 shown by black circles. Such a crystal structure corresponds to No. 225 (Fm-3m) of Non Patent Literature 3 in the classification of space groups. An example of the lattice constant and atomic coordinates of the D0$_3$ structure belonging to this space group number is shown in Table 1. However, the elements located at the sites Sn1, Cu1 and Cu2 that are shown in Table 1 can be substituted according to the alloy component. Specifically, in a case where the alloy component is a Cu—Sn—Si ternary alloy, Si can be substituted at the respective sites. Further, the numerical value of the lattice constant "a" described in Table 1 may be changed according to the alloy component. In addition, the atomic coordinates as well as the numerical values for occupancy of the respective sites shown in Table 1 may be changed according to the alloy component.

TABLE 1

Crystal Structure: D0$_3$
Space Group Number (International Table A): No. 225 (F m-3 m)
Lattice Constant: a = 6.05 Å (One example)

| Site Name | Atomic Species | Multiplicity/ Wyckoff Symbol | Atomic Coordinates | | |
|---|---|---|---|---|---|
| | | | x | y | z |
| Sn1 | Sn | 4a | 0.0 | 0.0 | 0.0 |
| Cu1 | Cu | 8c | ¼ | ¼ | ¼ |
| Cu2 | Cu | 4b | ½ | ½ | ½ |

Figure 3:
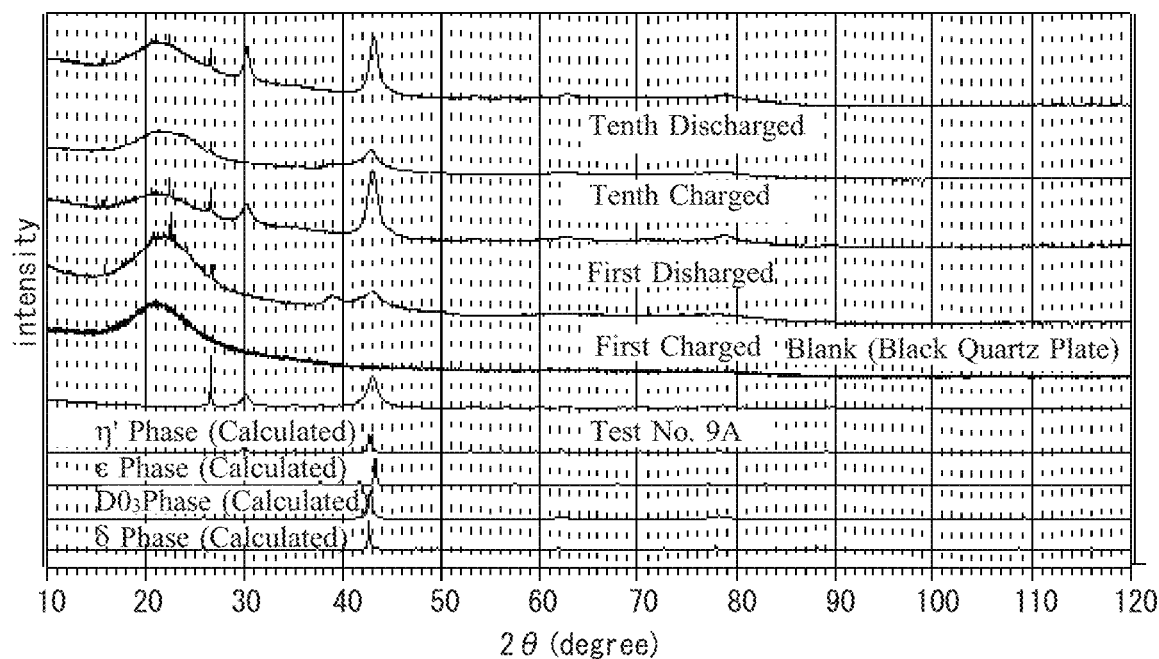
FIG. 3 is a view illustrating changes in X-ray diffraction profiles and a most intense diffraction line peak after charging and discharging of a negative electrode active material in a Test No. 9A in the examples.

The details of the crystal structure of the occlusion phase are unclear. However, it is considered that the situation is as follows. FIG. 3 is a view illustrating changes in X-ray diffraction profiles and a peak having a largest integrated diffraction intensity (hereinafter, referred to as "most intense diffraction line peak") after charging and discharging of a negative electrode active material in a Test No. 9A in the examples. In the X-ray diffraction profiles for first and tenth charge states and discharge states, a large peak on the low angle side is a peak originating from the glass of the sample holder. Referring to the X-ray diffraction profiles of the negative electrode active material of Test No. 9A in FIG. 3, in the negative electrode active material prior to occlusion of lithium ions, the most intense diffraction line peak (hkl: 220 in the case of the D0$_3$ phase, hkl: 660 in the case of the δ phase, hkl: 211 in the case of the ε phase, and hkl: 204, 132, 31-4, 42-2, 510 in the case of the η' phase) appears in a range of 42.0 to 44.0 degrees. Here, the aforementioned "hkl" means the Miller index (hkl). On the other hand, after charging (after occlusion of lithium ions), the most intense diffraction line peak broadens (width of the peak widens) (see the first and tenth charge states in FIG. 3). After discharging (after the release of lithium ions), the most intense diffraction line peak is sharpened (width of the peak narrows) again (see the first and tenth discharge states in FIG. 3). Based on the reversible behavior described above, it is found that the entire constituent phases including an occlusion phase reversibly change the crystal structure accompanying charging and discharging. Further, it is considered that volumetric changes that accompany such changes in the crystal structure are small. Note that, in the Miller index (hkl) in the present description, a number with a minus sign means that the number is for a component in the negative direction. For example, in the case of "31-4", the minus sign means that 4 is a component in the negative direction. Although originally the minus sign (−) should be written above the number, in the present description, for simplicity, the minus sign is added in front of the number.

[δ Phase]

The δ phase has a chemical composition of $Cu_{41}Sn_{11}$ in Cu—Sn binary alloys, and occludes and releases lithium ions. For the δ phase, volumetric changes accompanying changes in the crystal structure when occluding and releasing lithium ions are small. Therefore, if the alloy particle contains the δ phase, expansion and contraction of the alloy particle during charging and discharging can be suppressed. Accordingly, if the alloy particle contains the δ phase, the capacity retention ratio of the negative electrode active material increases.

The crystal structure of the δ phase is cubic, and is equivalent to the crystal structure model of $Cu_{41}Sn_{11}$ shown on page 1594 of Non Patent Literature 2, and corresponds to No. 216 (F-43m) of Non Patent Literature 3 in the classification of space groups. An example of the lattice constant and atomic coordinates of the crystal structure of δ phase belonging to this space group number is shown in Table 2. In the case of the δ phase of a Cu—Sn binary system of $Cu_{41}Sn_{11}$ shown on page 1594 of Non Patent Literature 2, Cu is located at the respective sites from Cu1 to Cu13, and Sn is located at the respective sites from Sn1 to Sn3. However, the elements located at the sites shown in Table 2 can be substituted depending on the alloy component. Specifically, in a case where the alloy component is a Cu—Sn—Si ternary alloy, Si can be substituted at each site. The numerical value of the lattice constant "a" shown in Table 2 may be changed according to the alloy component. The atomic coordinates as well as the numerical values for occupancy of the respective sites shown in Table 2 may also be changed according to the alloy component.

TABLE 2

δ Phase ($Cu_{41}Sn_{11}$) Cubic Crystal (cubic; F-cell)
Space Group Number(International Table A): No. 216 (F-43m)
Lattice Constant: a = 17.98 Å (One example)

| Site | Element | Multiplicity Wyck. | Atomic Coordinates x | y | z | Occupancy |
|---|---|---|---|---|---|---|
| Cu1 | Cu | 16e | 0.0573 | 0.0573 | 0.0573 | 0.75 |
| Cu2 | Cu | 16e | 0.3005 | 0.3005 | 0.3005 | 1.00 |
| Cu3 | Cu | 16e | 0.5504 | 0.5504 | 0.5504 | 1.00 |
| Cu4 | Cu | 16e | 0.8062 | 0.8062 | 0.8062 | 1.00 |
| Cu5 | Cu | 16e | 0.1657 | 0.1657 | 0.1657 | 1.00 |
| Cu6 | Cu | 16e | 0.4166 | 0.4166 | 0.4166 | 1.00 |
| Cu7 | Cu | 16e | 0.6664 | 0.6664 | 0.6664 | 1.00 |
| Sn1 | Sn | 16e | 0.9113 | 0.9113 | 0.9113 | 1.00 |
| Cu8 | Cu | 24f | 0.1763 | 0.0000 | 0.0000 | 1.00 |
| Cu9 | Cu | 24f | 0.6765 | 0.0000 | 0.0000 | 1.00 |
| Cu10 | Cu | 24g | 0.4241 | 0.2500 | 0.2500 | 1.00 |
| Sn2 | Sn | 24g | 0.9309 | 0.2500 | 0.2500 | 1.00 |
| Cu11 | Cu | 48h | 0.1562 | 0.1562 | 0.0186 | 1.00 |
| Cu12 | Cu | 48h | 0.6465 | 0.6465 | 0.5278 | 1.00 |
| Cu13 | Cu | 48h | 0.9087 | 0.9087 | 0.7631 | 1.00 |
| Sn3 | Sn | 48h | 0.4084 | 0.4084 | 0.2680 | 1.00 |

Structure Model Source: P. Villars, Pearson's Handbook Desk Edition Crystallographic Data for Intermetallic Phases Vol. 2, 1997/4, p. 1594

[ε Phase]

The ε phase has a chemical composition of $Cu_3Sn$ in the Cu—Sn binary alloys, and occludes and releases lithium ions. The reversible capacitance caused by storage of lithium ions of the ε phase is large in comparison to the $D0_3$ phase and the δ phase. Therefore, if the alloy particle contains the ε phase, the capacity per volume of the negative electrode active material further increases.

The crystal structure of the ε phase is orthorhombic, and among the two types of $Cu_3Sn$ shown on page 1593 of Non Patent Literature 2, is a crystal structure corresponding to No. 59 Choice 2 (Pmmn) of Non Patent Literature 3 in the classification of space groups. An example of the lattice constant and atomic coordinates of the crystal structure of the ε phase belonging to this space group number is shown in Table 3. In the case of the ε phase of the Cu—Sn binary system (No. 59 Choice 2 of Non Patent Literature 3) shown on page 1593 of Non Patent Literature 2, Sn is mainly located at the site of Sn1, and Cu is mainly located at the respective sites of Cu1 and Cu2. However, the elements located at the sites shown in Table 3 can be substituted depending on the alloy component. Specifically, in a case where the alloy component is a Cu—Sn—Si ternary alloy, Si can be substituted at each site. Further, the numerical values of the lattice constants "a", "b" and "c" shown in Table 3 may be changed according to the alloy component. In addition, the atomic coordinates as well as the numerical values for occupancy of the respective sites shown in Table 3 may also be changed according to the alloy component.

TABLE 3

ε phase ($Cu_3Sn$) Orthorhombic
Space Group Number(International Table A): No. 59-2 (Pmmn)
Lattice Constant: a = 5.49 Å, b = 4.32 Å, c = 4.74 Å (One example)

| Site | Element | Multiplicity Wyck. | Atomic Coordinates x | y | z | Occupancy |
|---|---|---|---|---|---|---|
| Sn1 | Sn | 2a | 0 | 0 | 0.333 | 1.0 |
| Cu1 | Cu | 2b | 0 | ½ | 0.667 | 1.0 |
| Cu2 | Cu | 4f | ¼ | 0 | 0.833 | 1.0 |

Structure Model Source: P. Villars, Pearson's Handbook Desk Edition Crystallographic Data for Intermetallic Phases Vol. 2, 1997/4, p. 1593

[η' Phase]

The η' phase has a chemical composition of $Cu_6Sn_5$ in the Cu—Sn binary alloys, and occludes and releases lithium ions. The reversible capacitance caused by storage of lithium ions of the η' phase is large in comparison to the $D0_3$ phase and the δ phase. Therefore, if the alloy particle contains the η' phase, the capacity per volume of the negative electrode active material further increases.

The crystal structure of the η' phase is monoclinic, and among the two types of $Cu_6Sn_5$ shown on pages 1593-1594 of Non Patent Literature 2, is a crystal structure corresponding to No. 15 (C2/c) of Non Patent Literature 3 in the classification of space groups. An example of the lattice constant and atomic coordinates of the crystal structure of η' phase belonging to this space group number is shown in Table 4. In the case of the η' phase of the Cu—Sn binary system (No. 15 of Non Patent Literature 3) shown on pages 1593-1594 of Non Patent Literature 2, Sn is mainly located at the site of Sn1, and Cu is mainly located at each of the other sites. However, the elements located at the sites shown in Table 4 can be substituted depending on the alloy component. Specifically, in a case where the alloy component is a Cu—Sn—Si ternary alloy, Si can be substituted at Sn1, Cu1 and Cu2. Further, the numerical values of the lattice constants "a", "b", "c" and "β" shown in Table 4 may be changed according to the alloy component. In addition, the atomic coordinates as well as the numerical values for occupancy of the respective sites shown in Table 4 may also be changed according to the alloy component.

TABLE 4

η' phase ($Cu_6Sn_5$) Monoclinic
Space Group Number (International Table A): No. 15 (C2/c)
Lattice Constant: a = 11.022 Å b = 7.282 Å c = 9.827 Å
α = 90° β = 98.84° γ = 90° (One example)

| Site | Element | Multiplicity Wyck. | Atomic Coordinates x | y | z | Occupancy |
|---|---|---|---|---|---|---|
| Cu1 | Cu | 8f | 0.39904 | 0.02703 | 0.29764 | 1.00 |
| Cu2 | Cu | 8f | 0.19380 | 0.00404 | 0.39028 | 1.00 |
| Cu3 | Cu | 4a | 0.00000 | 0.00000 | 0.00000 | 1.00 |
| Cu4 | Cu | 4e | 0.00000 | 0.83980 | 0.25000 | 1.00 |
| Sn1 | Sn | 8f | 0.39106 | 0.16250 | 0.02864 | 1.00 |
| Sn2 | Cu | 8f | 0.28518 | 0.34501 | 0.35792 | 1.00 |
| Sn3 | Cu | 4e | 0.00000 | 0.20108 | 0.25000 | 1.00 |

Structure Model Source: P. Villars, Pearson's Handbook Desk Edition Crystallographic Data for Intermetallic Phases Vol. 2, 1997/4, p. 1593-1594

[SiOx Phase (x=0.50 to 1.70)]

The SiOx phase (x=0.50 to 1.70) is an amorphous phase formed by mechanical alloying (hereinafter, also referred to as "MA") that is described later, and occludes and releases lithium ions. The reversible capacitance caused by storage of lithium ions of the SiOx phase (x=0.50 to 1.70) is large in comparison to the $D0_3$ phase and the δ phase. Therefore, if the alloy particle contains the SiOx phase (x=0.50 to 1.70), the capacity per volume of the negative electrode active material further increases.

The term "amorphous phase" refers to a phase in which, in the atomic arrangement, although order exists in the short range (short range order), order does not exist in long range (long range order). The term "short range order" refers to the order between atoms in the short range. Specifically, the term "short range order" means that there is regularity with respect to the values for the number of nearest atoms (nearest atoms number), the bonding distance between atoms, and the bond angle between atoms.

That is, the term "amorphous phase" means a phase in which an atomic arrangement (unit) in which short range order exists is irregularly connected. In the case of an amorphous phase, a sharp peak attributed to a periodic arrangement structure is not shown in an X-ray diffraction profile. The X-ray diffraction profile of an amorphous phase shows a halo pattern with a continuous peak with a broad width.

The "x" of the SiOx phase is in the range of 0.50 to 1.70. When x is less than 0.50, it means that a coarse Si phase is formed in the alloy particle. The Si phase is a crystalline substance that has both short range order and long range order. If the crystalline Si phase is formed, the degree of expansion and contraction of the negative electrode active material increases during charging and discharging, and the capacity retention ratio decreases. On the other hand, if x is more than 1.70, it means that an $SiO_2$ phase is formed in the alloy particle. In this case, at the time of the first charging, $SiO_2$ and lithium react to form lithium silicate (Li—Si—O compound). The capacitance of lithium silicate is small. Therefore, the capacity per volume (in particular, the initial efficiency) of the negative electrode active material decreases. A preferable lower limit of x is 0.60. A preferable upper limit of x is 1.60. The value for x is calculated based on the ratio between the analysis values of the two elements of Si and O obtained by analyzing the chemical composition of the SiOx phase (x=0.50 to 1.70) by EDS analysis that is described later.

[Method for Identifying Constituent Phases]

The constituent phases of the alloy particle are identified by the following method. A nano beam diffraction pattern is measured based on the regions of the respective constituent phases using a transmission electron microscope. In addition, analysis of the chemical composition by energy dispersive X-ray spectroscopy (hereinafter, referred to as "EDS analysis") is performed based on the same regions. By this means, the $D0_3$ phase, δ phase, ε phase, η' phase and SiOx phase (x=0.50 to 1.70) are identified.

Specifically, measurement is performed under the following conditions. First, a sample for transmission electron microscope (TEM) observation is prepared. The sample is manufactured using powder particles of the negative electrode active material taken out from the inside of the battery. The method for taking out the powder particles of the negative electrode active material from the inside of the battery is as follows. In the state before charging (if the battery was used, the state after discharging), the battery is disassembled within a glove box in an argon atmosphere, and the negative electrode plate is taken out from the battery. A small amount of the negative electrode active material mixture is peeled off with a spatula or the like from the negative electrode plate that was taken out. The negative electrode active material mixture is mounted on a transfer vessel that is capable of being transferred to a cryo-FIB apparatus and of being transferred to a TEM used for observation. The transfer vessel is then taken out from the glove box without being exposed to the air atmosphere. The inside of the glove box is made an argon atmosphere using argon gas that is supplied by a cylinder of ultra-high purity argon gas that has a purity of 99.9999% or more. In addition, the argon gas is passed through a purification apparatus that employs a catalyst or the like to thereby prevent inclusion of external impurities such as nitrogen. By this means, the dew point is controlled to be −60° C. or less, and a change in the properties of the negative electrode active material due to nitrogen or moisture is prevented. By this means, the dew point is controlled to be −60° C. or less, and a change in the properties of the negative electrode active material due to nitrogen or moisture is prevented. Thus, powder particles of the negative electrode active material are prepared. In a case where it is difficult to take out powder particles of the negative electrode active material from inside the battery, a sample for TEM observation is prepared using powder particles of the negative electrode active material after mechanical alloying (MA).

[Method for Preparing Sample for TEM Observation]

A thin film sample for transmission electron microscope (TEM) observation is prepared from the powder particles of the negative electrode active material that were prepared by the procedure described above. One of the prepared powder particles of the negative electrode active material is extracted. The extracted powder particle is irradiated with a gallium ion beam under vacuum and at the temperature of liquid nitrogen by a cryo-FIB (Focused Ion Beam) method to form a thin film sample. By preparing a thin film sample at a low temperature, changes in the constituent phases caused by an increase in the sample temperature that is caused by the FIB method can be suppressed. Quanta 3D FEG (trade name) manufactured by FEI Inc. is used as the cryo-FIB apparatus. The sampling method for producing a thin film sample is the cryo-FIB-μ sampling method. A mesh made of Mo is used when preparing the thin film sample, and carbon deposition (C deposition film) is used for surface protection. A powder particle having a size suitable for FIB processing is appropriately selected as the powder particle that is extracted from among the powder particles of the negative electrode active material. The types of constituent phases and the mean particle diameter of the SiOx phase (x=0.50 to 1.70) that is described later are not affected by the size of the powder particles of the negative electrode active material. The thickness of the thin film sample is about 100 nm or less.

[TEM Observation and EDS Analysis]

The thin film sample for TEM observation that was prepared by the method described above is subjected to TEM observation and EDS analysis. The TEM model type, the photographing conditions for the bright field image and the electron diffraction pattern, and the conditions for EDS analysis are as follows.

Electron microscope model type: 200 kV field emission transmission electron microscope JEM-2100F (manufactured by JEOL Ltd.)
Acceleration voltage during observation: 200 kV
Camera length: 20 cm (DIFF mode)
Analysis: EDS analyzer JED-2300T (manufactured by JEOL Ltd.)
Acceleration voltage during analysis: 200 kV
Probe diameter during EDS analysis: 1 nm
Analysis software for EDS analysis values: JED Analysis Program ver. 3.8.0.32 (software name) manufactured by JEOL Ltd.
Electron diffraction: Nano Beam Diffraction (NBD)
Probe diameter: Approximately 10 nm or approximately 3 nm
Settings at time of EDS semi-quantitative analysis:
  Quantitative: Ratio
  Quantitative mode: Standard less
  Calculation method: Pure
  Use absorption correction: None
Characteristic X-ray peaks used for EDS semi-quantitative calculation: O—K, Si—K, (Fe—K), Cu-L, Sn-L Measurement of electron diffraction patterns and EDS analysis are performed based on the obtained bright field images. FIG. 4, FIG. 8, FIG. 11 and FIG. 14 are bright field images obtained when the negative electrode active material of a Test No. 1 in the examples that are mentioned later was observed by a transmission electron microscope. In the EDS analysis, in the region of the D0$_3$ phase, the δ phase, the ε phase and the η' phase, the detected amounts of Cu and Sn that are heavy elements are large. Therefore, in these phases the ratio of elements having a large atomic scattering factor is high in comparison to a region containing oxygen that is a light element such as in the SiOx phase (x=0.50 to 1.70). Therefore, in the bright field image, these phases are observed as a gray to black color as scattering contrast that is derived from the composition. On the other hand, oxygen that has a small atomic scattering factor is contained in the region of the SiOx phase (x=0.50 to 1.70). Therefore, in the bright field image, the SiOx phase (x=0.50 to 1.70) is observed as a relatively white color as the scattering contrast that is derived from the composition. Measurement of electron diffraction patterns and EDS analysis are performed based on this information of the bright field image.

Figure 5:
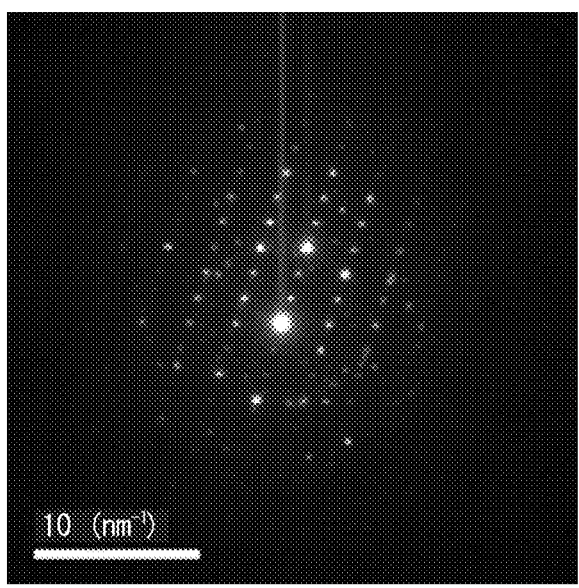
FIG. 5 is an electron diffraction pattern of a δ phase.
Figure 6:
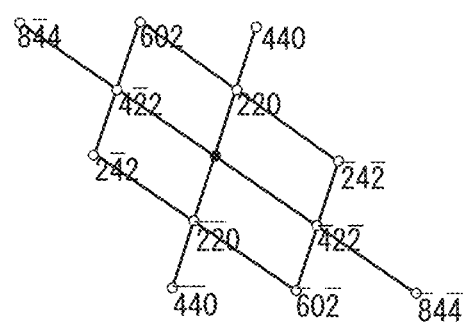
FIG. 6 is a schematic diagram of an electron diffraction pattern of a δ phase.

An electron diffraction pattern of each contrast region is measured by tilting the sample inside the transmission electron microscope. FIG. 5 is an electron diffraction pattern that was measured with respect to a black region 1 in FIG. 4. Referring to FIG. 5, an electron diffraction pattern having a specific diffraction point is obtained from region 1 (at such time, the incident orientation of the electron beam is [1-1-3] of the δ phase shown in Table 2). Furthermore, when EDS analysis is performed with respect to region 1, it is found that region 1 has a chemical composition of $Cu_{41}Sn_{11}$. Based on the result of analysis of the aforementioned electron diffraction pattern and the result of EDS analysis, region 1 is identified as being the δ phase. A schematic diagram of an electron diffraction pattern of the δ phase obtained by indexing the electron diffraction pattern shown in FIG. 5 is illustrated in FIG. 6.

Figure 4:
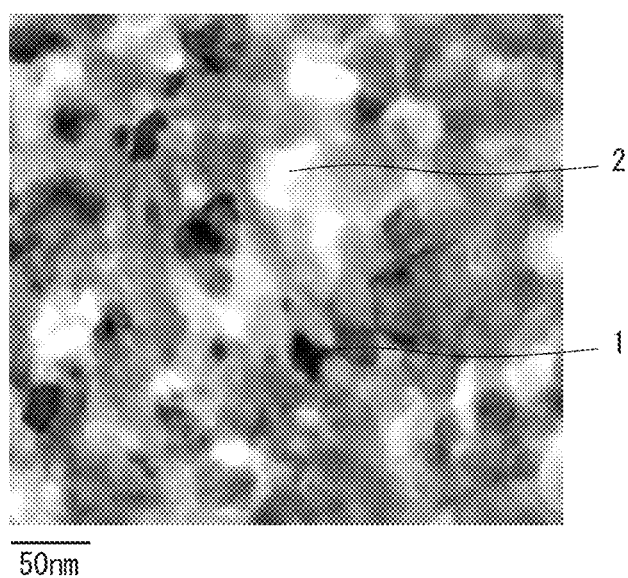
FIG. 4 is a bright field image obtained by transmission electron microscope observation of a negative electrode active material in a Test No. 1 in the examples.
Figure 7:
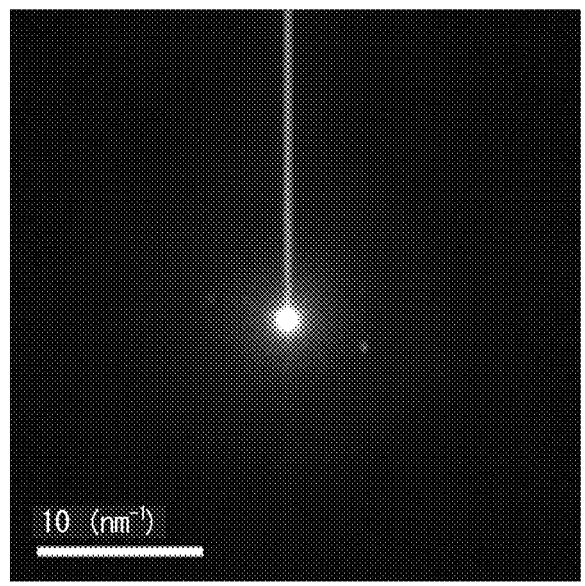
FIG. 7 is an electron diffraction pattern of an SiOx phase.

FIG. 7 is an electron diffraction pattern that was measured with respect to a relatively white region 2 in FIG. 4. Referring to FIG. 7, a specific diffraction point or a clear diffraction ring is not observed from region 2, and a halo ring that is characteristic of amorphous material is observed. Further, even if the sample is tilted, the diffraction conditions are not satisfied. Thus, it is identified that the reason that region 2 appears relatively white is due to scattering contrast, and that region 2 is a region in which the ratio of light elements which have a small atomic scattering factor is high. In addition, EDS analysis is performed with respect to region 2. The analysis values for the four elements Cu, Sn, Si and O are converted into atomic ratios, and if an atomic ratio obtained by adding together the atomic ratios for Si and O is 60% or more of the whole, region 2 is regarded as being the SiOx phase (x=0.50 to 1.70). The arithmetic mean of analysis values measured with respect to five locations within the relatively white region is used as the EDS analysis value. By means of the above procedure, region 2 is identified as being the SiOx phase (x=0.50 to 1.70).

Figure 8:
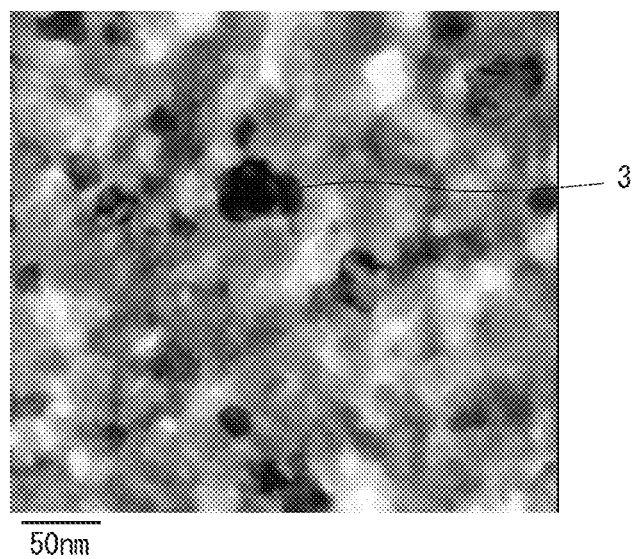
FIG. 8 is a bright field image obtained by transmission electron microscope observation of a negative electrode active material in Test No. 1 in the examples, at another observation point that is different from FIG. 4.
Figure 9:
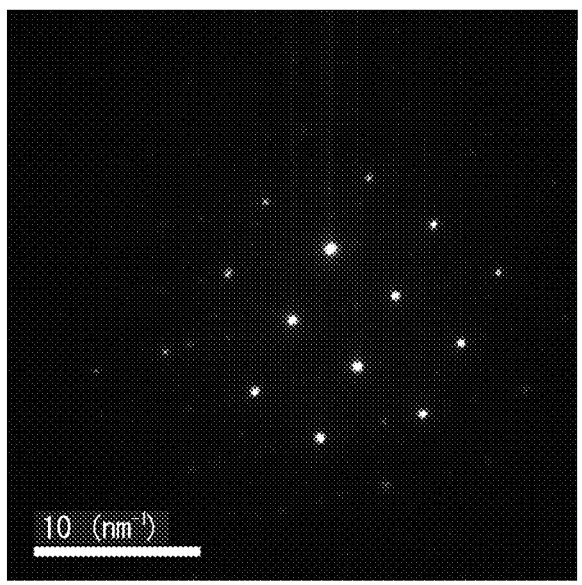
FIG. 9 is an electron diffraction pattern of an ε phase.
Figure 10:
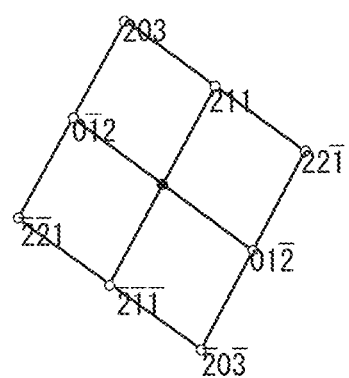
FIG. 10 is a schematic diagram of an electron diffraction pattern of an ε phase.

FIG. 9 is an electron diffraction pattern that was measured with respect to a black region 3 in FIG. 8. Referring to FIG. 9, an electron diffraction pattern having a specific diffraction point is obtained from region 3 (at such time, the incident orientation of the electron beam is [3-4-2] of the ε phase shown in Table 3). Furthermore, when EDS analysis is performed with respect to region 3, it is found that region 3 has a chemical composition of $Cu_3Sn$. Based on the result of analysis of the aforementioned electron diffraction pattern and the result of EDS analysis, region 3 is identified as being the ε phase. A schematic diagram of an electron diffraction pattern of the ε phase obtained by indexing the electron diffraction pattern shown in FIG. 9 is illustrated in FIG. 10.

Figure 11:
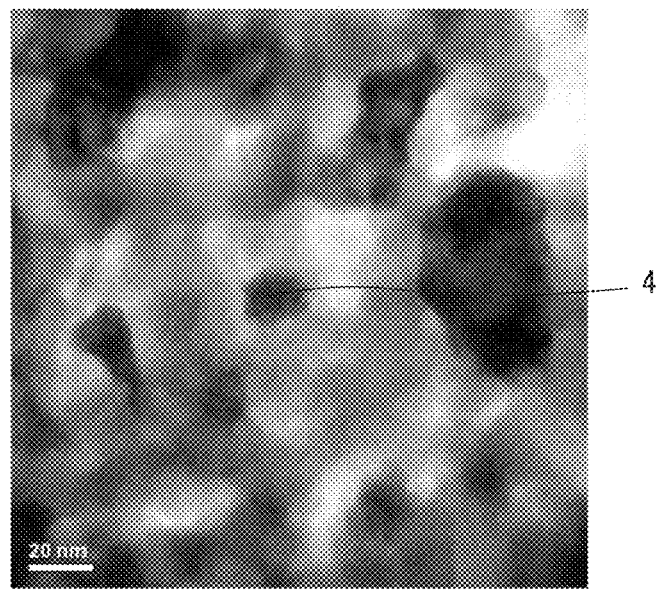
FIG. 11 is a bright field image obtained by transmission electron microscope observation of a negative electrode active material in Test No. 1 in the examples, at another observation point that is different from FIG. 4 and FIG. 8.
Figure 12:
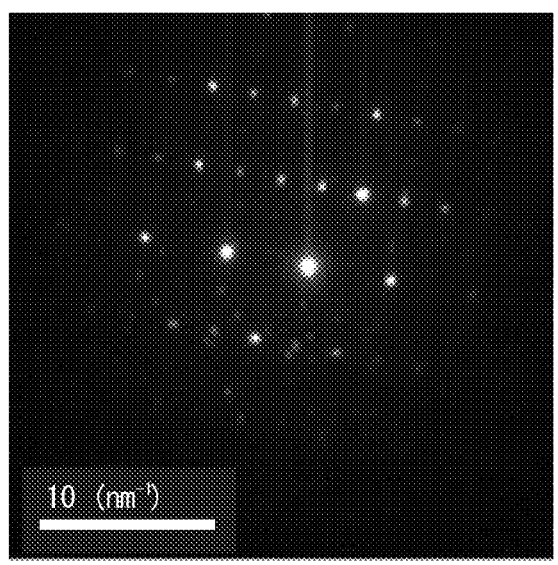
FIG. 12 is an electron diffraction pattern of an η' phase.
Figure 13:
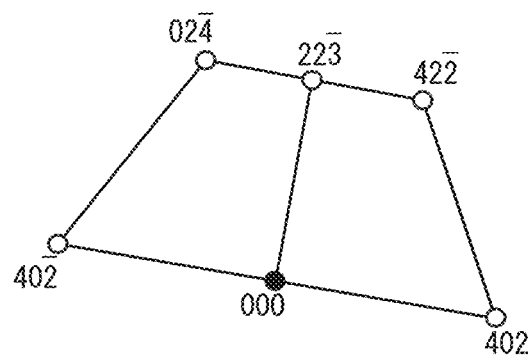
FIG. 13 is a schematic diagram of an electron diffraction pattern of an η' phase.

FIG. 12 is an electron diffraction pattern that was measured with respect to a black region 4 in FIG. 11. Referring to FIG. 12, an electron diffraction pattern having a specific diffraction point is obtained from region 4 (at such time, the incident orientation of the electron beam is [14-2] of the η' phase shown in Table 4). Furthermore, when EDS analysis is performed with respect to region 4, it is found that region 4 has a chemical composition of $Cu_6Sn_5$. Based on the result of analysis of the aforementioned electron diffraction pattern and the result of EDS analysis, region 4 is identified as being the η' phase. A schematic diagram of an electron diffraction pattern of the η' phase obtained by indexing the electron diffraction pattern shown in FIG. 12 is illustrated in FIG. 13.

Figure 14:
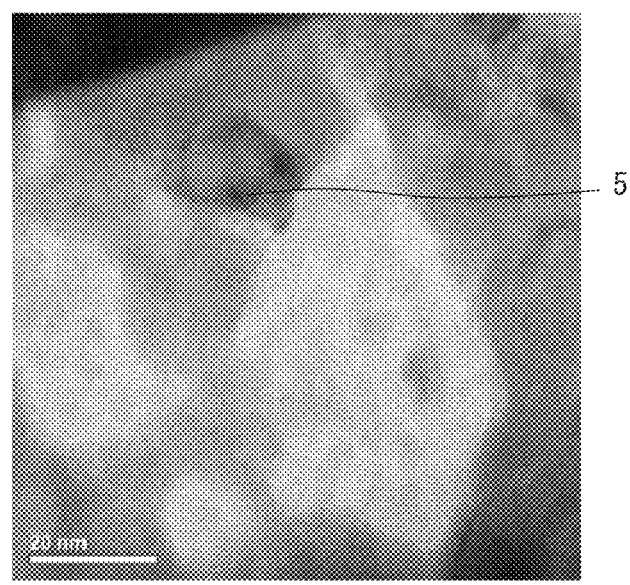
FIG. 14 is a bright field image obtained by transmission electron microscope observation of a negative electrode active material in Test No. 1 in the examples, at another observation point that is different from FIG. 8 and FIG. 11.
Figure 15:
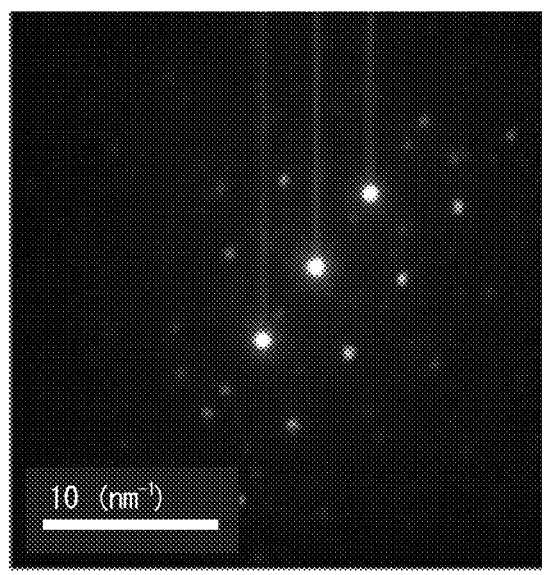
FIG. 15 is an electron diffraction pattern of a D0₃ phase.
Figure 16:
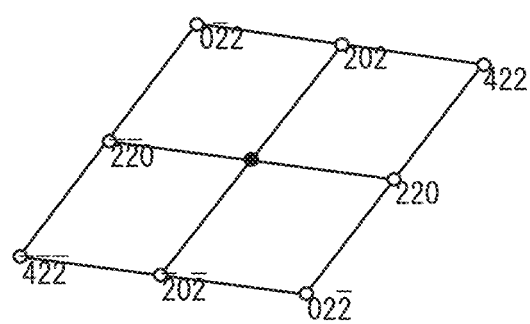
FIG. 16 is a schematic diagram of an electron diffraction pattern of a D0₃ phase.

FIG. 15 is an electron diffraction pattern that was measured with respect to a black region 5 in FIG. 14. Referring to FIG. 15, an electron diffraction pattern having a specific diffraction point is obtained from region 5 (at such time, the incident orientation of the electron beam is [1-1-1] of the D0$_3$ structure shown in Table 1). Furthermore, when EDS analysis is performed with respect to region 5, it is found that region 5 has a chemical composition of Cu—Sn. Based on the result of analysis of the aforementioned electron diffraction pattern and the result of EDS analysis, region 5 is identified as being the D0$_3$ phase. A schematic diagram of an electron diffraction pattern of the D0$_3$ phase obtained by indexing the electron diffraction pattern shown in FIG. 15 is illustrated in FIG. 16.

[Si Content of D0₃ Phase, δ Phase, ε Phase and η' Phase]

During mechanical alloying (MA), Si move out of the D0₃ phase, the δ phase, the ε phase and the η' phase, and the Si content in these phases is 5 at % or less. Si may completely move out of these phases. Accordingly, the Si content of the D0₃ phase, the δ phase, the ε phase and the η' phase may be 0 at %. On the other hand, in a case where the Si content of any phase among the D0₃ phase, the δ phase, the ε phase and the η' phase in the alloy particle is more than 5 at %, it means that the amount of the SiOx phase (x=0.50 to 1.70) formed in the alloy particle is insufficient. In this case, the capacity per volume of the negative electrode active material decreases. Accordingly, the Si content of the D0₃ phase is in the range of 0 to 5.0 at %. The Si content of the δ phase is in the range of 0 to 5.0 at %. The Si content of the ε phase is in the range of 0 to 5.0 at %. The Si content of the η' phase is in the range of 0 to 5.0 at %. The Si content of the D0₃ phase, the δ phase, the ε phase and the η' phase in the alloy particle can be adjusted to within the range of 0 to 5.0 at % by a mechanical alloying (MA) process that is described later.

[Method for Measuring Si Content of D0₃ Phase, δ Phase, ε Phase and η' Phase]

The Si content of the D0₃ phase, the δ phase, the ε phase and the η' phase is determined by performing EDS analysis under the aforementioned conditions. Specifically, EDS analysis values for the four elements Cu, Sn, Si and O are calculated by converting from EDS analysis values of each phase obtained under the aforementioned conditions into atomic ratios. EDS analysis is performed at five locations for each phase, and the arithmetic mean of the obtained values is used.

[Most Intense Diffraction Line Peak]

The alloy particle has a most intense diffraction line peak (diffraction line peak having largest integrated diffraction intensity) in a range of 42.0 to 44.0 degrees of a diffraction angle 2θ in an X-ray diffraction profile. The peaks in this range are mainly derived from the D0₃ phase and the δ phase, and are also peaks to which diffraction from the ε phase and the η' phase also contributes. Therefore, if the alloy particle has a most intense diffraction line peak in this range, it means that the alloy particle contains these phases.

[Method for Measuring Most Intense Diffraction Line Peak]

Measurement of the most intense diffraction line peak is performed by the following method. First, a sample for X-ray diffraction measurement is prepared. The sample is prepared by taking out the negative electrode active material from the inside of the battery. The sample is subjected to X-ray diffraction measurement to obtain an X-ray diffraction profile. The position of the most intense diffraction line peak is identified from the X-ray diffraction profile.

The procedure for taking out the negative electrode active material from the inside of the battery and performing X-ray diffraction measurement is as follows. In the state before charging (if the battery was used, the state after discharging), the battery is disassembled within a glove box in an argon atmosphere, and the negative electrode is taken out from the battery. The negative electrode that was taken out is enclosed with Mylar foil. Thereafter, the circumference of the Mylar foil is sealed using a heat sealing machine. The negative electrode that is sealed by the Mylar foil is then taken out from the glove box. The inside of the glove box is made an argon atmosphere using argon gas that is supplied by a cylinder of ultra-high purity argon gas that has a purity of 99.9999% or more. In addition, the argon gas is passed through a purification apparatus that employs a catalyst or the like to thereby prevent inclusion of external impurities such as nitrogen. By this means, the dew point is controlled to be −60° C. or less, and a change in the properties of the negative electrode active material due to nitrogen or moisture is prevented.

Next, a sample is fabricated by bonding the negative electrode to a reflection-free sample plate with hair spray. The term "reflection-free sample plate" refers to a plate of a silicon single crystal which is cut out such that a specific crystal plane is parallel with the measurement plane. The reflection-free sample plate does not generate interference lines such as diffraction lines and halos. The sample is mounted onto an X-ray diffraction apparatus and X-ray diffraction measurement is performed on the sample to obtain an X-ray diffraction profile.

The measurement conditions for the X-ray diffraction measurement are as follows.

Apparatus: SmartLab manufactured by Rigaku Co., Ltd.
X-ray tube: Cu—Kα ray
X-ray output: 45 kV, 200 mA
Incident monochromator: Johannson type crystal (which filters out Cu—Kα₂ ray and Cu—Kβ ray)
Optical system: Bragg-Brentano geometry
Incident parallel slit: 5.0 degrees
Incident slit: ½ degree
Length limiting slit: 10.0 mm
Receiving slit 1: 8.0 mm
Receiving slit 2: 13.0 mm
Receiving parallel slit: 5.0 degrees
Goniometer: SmartLab goniometer
X-ray source-mirror distance: 90.0 mm
X-ray source-selection slit distance: 114.0 mm
X-ray source-sample distance: 300.0 mm
Sample-receiving slit 1 distance: 187.0 mm
Sample-receiving slit 2 distance: 300.0 mm
Receiving slit 1-receiving slit 2 distance: 113.0 mm
Sample-detector distance: 331.0 mm
Detector: D/Tex Ultra
Measurement range: 10 to 120 degrees
Data acquisition angle interval: 0.02 degrees
Scan method: continuous
Scanning speed: 2.0 degrees/min Note that, in the X-ray diffraction profile of the alloy particle of the negative electrode active material of the present embodiment, a diffraction line peak of an Si simple substance is not observed under the aforementioned measurement conditions. It is surmised that the reason is that the Si element contained in the raw material alloy in the mechanical alloying (MA) process is not liberated as an Si simple substance phase from the D0₃ phase, the δ phase, the ε phase and the η' phase in the course of the mechanical alloying (MA), but is instead liberated as the SiOx amorphous phase.

[Half-Width of Most Intense Diffraction Line Peak]

In the negative electrode active material, the half-width of the most intense diffraction line peak (diffraction line peak having the largest integrated diffraction intensity) (hereunder, referred to simply as "half-width") is in a range of 0.15 to 2.50 degrees. If the half-width is less than 0.15 degrees, the discharge capacity and initial efficiency of the negative electrode active material decrease. On the other hand, if the half-width is greater than 2.50 degrees, the capacity retention ratio of the negative electrode active material will decrease. If the half-width is in the range of 0.15 to 2.50 degrees, the capacity retention ratio can be increased while also increasing the discharge capacity and initial efficiency of the negative electrode active material.

The reason the discharge capacity, initial efficiency and capacity retention ratio of the negative electrode active material increase if the half-width is in the aforementioned range is considered to be as follows. The half-width is an index of the average size (crystallite diameter) of crystallite (smallest region that can be regarded as a single crystal). In particular, in powder X-ray diffraction, the individual crystallites constituting the powder particles can be regarded as regions of the smallest unit that contributes to diffraction with respect to incident X-rays. The half-width varies depending on the crystallite diameter. Specifically, there is a tendency for the half-width to widen as the crystallite diameter decreases. This phenomenon can be quantitatively evaluated by means of the Scherrer equation.

The Scherrer equation is as follows.

$$D=(K \cdot \lambda)/\{B \cdot \cos \theta\}$$

D: crystallite diameter (nm)

K: Scherrer constant (dimensionless)

λ: wavelength of X-rays (nm)

B: half-width derived from material (radian)

η: diffraction angle during X-ray diffraction measurement by θ-2θ method (radian)

The Scherrer constant K=0.94 is used in relation to the Scherrer equation in the present description. The wavelength (λ) of the X-ray for measurements is monochromated to Cu—K$\alpha_1$. A value of λ=0.15401 nm is adopted as a value corresponding to the wavelength thereof.

The crystallite boundary regions function as diffusion paths of lithium at the time of charging and discharging and lithium storage sites. In a case where the half-width is too narrow, the crystallite diameter is excessively large. In this case, the numerical density of storage sites decreases, and the discharge capacity declines. In addition, in many cases the initial efficiency has a positive correlation with the discharge capacity. Consequently, if the crystallite diameter becomes large, the initial efficiency also decreases together with a decrease in the discharge capacity. In a case where the discharge capacity is small, it is considered that a ratio at which lithium that is temporarily incorporated into the active material by the initial charging stabilizes increases, and as a result the lithium in the active material cannot be taken out therefrom during discharging. On the other hand, in a case where the half-width is too wide, the crystallite diameter is excessively small. In this case, although there are many lithium storage sites and the initial capacity increases, it is considered that, the ratio at which lithium stabilizes at the crystallite boundary regions is liable to increase as the charge-discharge cycle proceeds. It is considered that, as a result, the capacity retention ratio decreases.

Accordingly, it is considered that if the half-width is in the range of 0.15 to 2.50 degrees, the crystallite becomes the appropriate size, and the discharge capacity, initial efficiency and capacity retention ratio of the negative electrode active material increases. A preferable lower limit of the half-width is 0.30 degrees, more preferably is 0.50 degrees, and further preferably is 0.70 degrees. A preferable upper limit of the half-width is 2.20 degrees, and more preferably is 2.00 degrees. The same applies with respect to the negative electrode active material in a discharged state after repeating charging and discharging.

Note that, the aforementioned half-width B derived from the material and the actually measured half-width $B_{obs}$ have the following relationship.

$$B_{obs}=B+b$$

$B_{obs}$: measured half-width (radian)

b: mechanical half-width attributed to X-ray diffraction apparatus (radian)

The mechanical half-width b attributed to the X-ray diffraction apparatus is measured using a standard sample of $LaB_6$ crystal having a sufficiently large crystallite diameter. The value b=8.73×10$^{-4}$ radian (0.05 degrees) is used as a correction value for the vicinity of the target 2θ region. Therefore, when simply the term "half-width" is used in the present description, it refers not to an actually measured half-width $B_{obs}$, but to the half-width after the aforementioned correction, that is, the half-width (B=$B_{obs}$−b) derived from the material. In addition, although for convenience the unit thereof is described as "degrees" in the text of the present description, the unit "radian" is used for the aforementioned calculation.

Preferably, the crystallite diameter is in a range of 3.0 to 90.0 nm. A further preferable lower limit of the crystallite diameter is 4.0 nm, and further preferably is 5.0 nm. A further preferable upper limit of the crystallite diameter is 40.0 nm, and further preferably is 20.0 nm, and further preferably is 15.0 nm. This applies with respect to the negative electrode active material in a discharged state after repeating charging and discharging.

[Method for Measuring Half-Width]

The method for measuring the half-width is as follows. An X-ray diffraction profile is obtained according to the method for measuring the most intense diffraction line peaks that is described above. Among the respective peaks of the obtained X-ray diffraction profile, the most intense diffraction line peak (diffraction line peak having largest integrated diffraction intensity) appearing in the range of 42.0 to 44.0 degrees is identified. The peak width (full width at half maximum) is determined at an integrated diffraction intensity that is half of the integrated diffraction intensity of the most intense diffraction line peak. By this means, the actually measured half-width $B_{obs}$ (Δ2θ/degree) is obtained. The mechanical half-width b=0.05 degrees (8.73×10$^{-4}$ radian) attributed to the aforementioned X-ray diffraction apparatus is subtracted as a correction value from the actually measured half-width $B_{obs}$, and the resulting value is taken as the half-width B (Δ2θ/degrees) derived from the material.

[Mean Particle Diameter of SiOx Phase]

Preferably, the mean particle diameter of the SiOx phase (x=0.5 to 1.7) is in a range of 3.0 to 90.0 nm in equivalent circular diameter. If the mean particle diameter of the SiOx phase (x=0.5 to 1.7) is 90.0 nm or less, differences between phases with respect to the expansion/contraction rate caused by storage of lithium is suppressed. In this case, interfacial strain between the SiOx phase (x=0.5 to 1.7) and other phases that arises due to charging and discharging is suppressed, and collapse of the negative electrode active material is suppressed. As a result, the capacity retention ratio of the negative electrode active material increases. On the other hand, although the SiOx phase (x=0.5 to 1.7) is preferably as small as possible, in some cases, in terms of the production process, it is difficult to make the SiOx phase (x=0.5 to 1.7) less than 3.0 nm. Accordingly, a preferable mean particle diameter of the SiOx phase (x=0.5 to 1.7) is in the range of 3.0 to 90.0 nm in equivalent circular diameter. A more preferable lower limit of the mean particle diameter of the SiOx phase (x=0.5 to 1.7) is 4.0 nm, and further preferably is 5.0 nm. A more preferable upper limit of the mean particle diameter of the SiOx phase (x=0.5 to 1.7) is 40.0 nm, and further preferably is 20.0 nm. With regard to a preferable mean particle diameter of the SiOx phase (x=0.5 to 1.7), the same applies with respect to the negative electrode active material in a discharged state after repeating charging and discharging. The mean particle diameter of the SiOx phase (x=0.5 to 1.7) can be adjusted by a mechanical alloying (MA) process that is described later.

[Method for Measuring Mean Particle Diameter of SiOx Phase (x=0.50 to 1.70)]

The mean particle diameter of the SiOx phase (x=0.50 to 1.70) is measured by the following method. Bright field images are taken at an arbitrary three locations of the thin film sample prepared for use in the aforementioned transmission electron microscope (TEM) observation to thereby create images. The size of each visual field is set as 350 nm×350 nm, and the number of pixels is approximately 650 pixels per one side of the visual field. The shape of the pixels is quadrate in real space.

Figure 17:
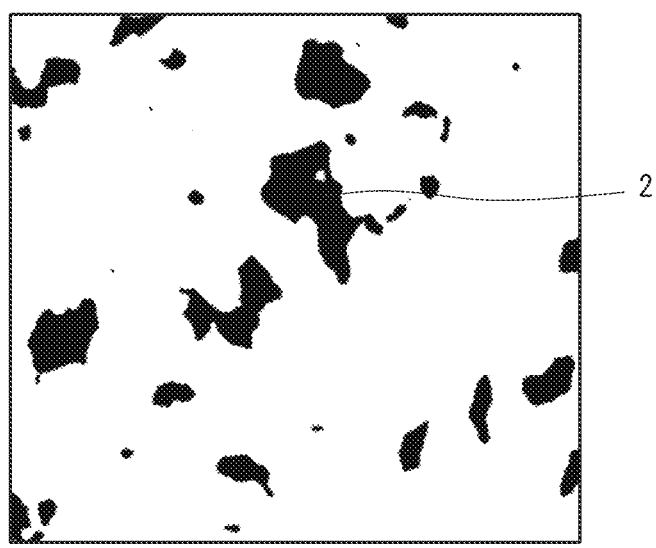
FIG. 17 is a binary image of the bright field image shown in FIG. 4.

Image processing of the photographed bright field images is performed. First, the brightness and contrast are adjusted. Next, each of the photographed bright field images is saved in an electronic file in bitmap format or JPEG format. At such time, using a grayscale with 255 gradations between white and black (zero corresponds to black, and 255 corresponds to white), a histogram is saved in a state close to the shape of a normal distribution. Using the saved electronic file, the mean particle diameter of the SiOx phase (x=0.5 to 1.7) is determined by performing an equivalent circular diameter conversion by means of image processing software. For example, ImageJ Ver. 1.43U (software name) is used as the image processing software. The specific procedure is as follows. The electronic file of the bright field image that is the analysis object is read into the ImageJ software. Reduction scale information (scale) is set for the bright field image that was read in. More specifically, a grayscale histogram of the bright field image is extended over the entire region of the gradations from 0 to 255 to obtain a grayscale image. White regions in the grayscale image are regions that correspond to the SiOx phase (x=0.5 to 1.7). A grayscale extraction target is set so as to be in the range of 210 to 255 with respect to the grayscale image obtained by extending the histogram over the entire region of gradations from 0 to 255, and a binarized image is obtained. In the binarized image, the SiOx phase (x=0.5 to 1.7) is observed as a black region. Black regions corresponding to the SiOx phase (x=0.5 to 1.7) are extracted from the binarized image. A binary image created by the aforementioned image processing based on the bright field image shown in FIG. 4 is shown in FIG. 17. The SiOx phase (x=0.5 to 1.7) that was observed as a relatively white region 2 in FIG. 4 is observed as a black region 2 in FIG. 17. From the binarized image, the number of regions corresponding to the SiOx phase (x=0.50 to 1.70) and the area of each region are determined by a well-known method.

All of the obtained areas of the SiOx phase (x=0.5 to 1.7) are converted to equivalent circular diameters, and a weighted average value is determined. A weighted average value is determined based on the areas of the SiOx phase (x=0.5 to 1.7) in all of the bright field images that were taken at three arbitrary locations of the thin film sample as described above, and the thus-determined weighted average value is adopted as the mean particle diameter of the SiOx phase (x=0.5 to 1.7). When determining the equivalent circular diameter, the number of SiOx phase (x=0.5 to 1.7) regions (number of regions corresponding to the SiOx phase (x=0.5 to 1.7) in the bright field image) is made 20 or more. In a case where the total number of SiOx phase (x=0.5 to 1.7) regions at all of the aforementioned three locations is less than 20, the number of observation locations is increased until the total number of SiOx phase (x=0.5 to 1.7) regions becomes 20 or more.

[Form of Micro-Structure]

The respective constituent phases of the alloy particle form a composite micro-structure. Thus, in addition to a high discharge capacity, the negative electrode active material also exhibits an excellent capacity retention ratio. Although the reason for this is not clear, it is presumed to be as follows. The reversible capacitance caused by storage of lithium ions is large in the ε phase, the η' phase and the SiOx phase (x=0.5 to 1.7) in comparison to the $D0_3$ phase and the δ phase. Therefore, in a case where the ε phase, the η' phase and the SiOx phase (x=0.5 to 1.7) are each present as a single phase, the degree of expansion/contraction is large over the course of the charge-discharge cycle. Accordingly, in a case where the alloy particle contains the ε phase, the η' phase and the SiOx phase (x=0.5 to 1.7) as single phases, the capacity per volume of the negative electrode active material increases. On the other hand, when the alloy particle contains the ε phase, the η' phase and the SiOx phase (x=0.5 to 1.7) as single phases, the capacity retention ratio of the negative electrode active material is liable to decrease. However, expansion/contraction of the ε phase, the η' phase and the SiOx phase (x=0.5 to 1.7) is suppressed by the ε phase, the η' phase and the SiOx phase (x=0.5 to 1.7) forming a composite micro-structure with the $D0_3$ phase and the δ phase. It is considered that, consequently, the negative electrode active material can realize both a high discharge capacity and an excellent capacity retention ratio.

[Optional Elements]

As long as the alloy particle can contain the aforementioned phases ($D0_3$ phase, δ phase, ε phase, η' phase and SiOx phase (x=0.5 to 1.7)), the alloy component may contain one or more types of element selected from a group consisting of Ti, V, Cr, Mn, Fe, Co, Ni, Zn, Al, B and C in place of a part of Cu.

Preferably, the alloy component may contain, in place of a part of Cu, one or more types of element selected from a group consisting of Ti: 2.00 at % or less, V: 2.00 at % or less, Cr: 2.00 at % or less, Mn: 2.00 at % or less, Fe: 2.00 at % or less, Co: 2.00 at % or less, Ni: 3.00 at % or less, Zn: 3.00 at % or less, Al: 3.00 at % or less, B: 2.00 at % or less and C: 2.00 at % or less. The aforementioned Ti, V, Cr, Mn, Fe, Co, Ni, Zn, Al, B and C are optional elements and may not be contained.

As described above, a preferable upper limit of the Ti content is 2.00 at %. A further preferable upper limit of the Ti content is 1.00 at %, and more preferably is 0.50 at %. A preferable lower limit of the Ti content is 0.01 at %, more preferably is 0.05 at %, and further preferably is 0.10 at %.

As described above, a preferable upper limit of the V content is 2.00 at %. A more preferable upper limit of the V content is 1.00 at %, and further preferably is 0.50 at %. A preferable lower limit of the V content is 0.01 at %, more preferably is 0.05 at %, and further preferably is 0.10 at %.

As described above, a preferable upper limit of the Cr content is 2.00 at %. A more preferable upper limit of the Cr content is 1.00 at %, and further preferably is 0.50 at %. A preferable lower limit of the Cr content is 0.01 at %, more preferably is 0.05 at %, and further preferably is 0.10 at %.

As described above, a preferable upper limit of the Mn content is 2.00 at %. A more preferable upper limit of the Mn content is 1.00 at %, and further preferably is 0.50 at %. A preferable lower limit of the Mn content is 0.01 at %, more preferably is 0.05 at %, and further preferably is 0.10 at %.

As described above, a preferable upper limit of the Fe content is 2.00 at %. A more preferable upper limit of the Fe content is 1.00 at %, and further preferably is 0.50 at %. A preferable lower limit of the Fe content is 0.01 at %, more preferably is 0.05 at %, and further preferably is 0.10 at %.

As described above, a preferable upper limit of the Co content is 2.00 at %. A more preferable upper limit of the Co content is 1.00 at %, and further preferably is 0.50 at %. A preferable lower limit of the Co content is 0.01 at %, more preferably is 0.05 at %, and further preferably is 0.10 at %.

As described above, a preferable upper limit of the Ni content is 3.00 at %. A more preferable upper limit of the Ni content is 2.00 at %. A preferable lower limit of the Ni content is 0.10 at %.

As described above, a preferable upper limit of the Zn content is 3.00 at %. A more preferable upper limit of the Zn content is 2.00 at %. A preferable lower limit of the Zn content is 0.10 at %, more preferably is 0.50 at %, and further preferably is 1.00 at %.

As described above, a preferable upper limit of the Al content is 3.00 at %. A more preferable upper limit of the Al content is 2.50 at %, and further preferably is 2.00 at %. A preferable lower limit of the Al content is 0.10%, more preferably is 0.20 at %, and further preferably is 0.50 at %.

A preferable upper limit of the B content is 2.00 at %. A more preferable upper limit of the B content is 1.00 at %, and further preferably is 0.50 at %. A preferable lower limit of the B content is 0.01 at %, more preferably is 0.05 at %, and further preferably is 0.10 at %.

A preferable upper limit of the C content is 2.00 at %. A more preferable upper limit of the C content is 1.00 at %, and further preferably is 0.50 at %. A preferable lower limit of the C content is 0.01 at %, more preferably is 0.05 at %, and further preferably is 0.10 at %.

[Diameter of Alloy Particle]

The mean particle diameter of the alloy particle according to the embodiment of the present invention is for example, in the range of 0.5 to 50 μm. When the mean particle diameter is 0.5 μm or more, the specific surface area does not become too large. Therefore, the irreversible capacity is small, and the initial charging and discharging efficiency is improved. On the other hand, when the mean particle diameter of the alloy particle is 50 μm or less, flat and thin electrodes can be produced. A more preferable lower limit of the particle diameter of the alloy particle is 1.0 μm. A more preferable upper limit of the particle diameter of the alloy particle is 20 μm.

The method for measuring the particle diameter of the alloy particle is as follows. The particle diameter is measured by a laser diffraction scattering method using a laser diffraction-scattering type particle size distribution analyzer, in accordance with JIS Z 8825 (2013). The dispersion medium used in the measurement is water to which 0.1% by mass of a surface-active agent containing alkylglycoside is added. The dispersion method is 5 minutes with ultrasonic. The particle diameter when the cumulative volume with respect to the volume of all particles becomes 50% (volume mean particle diameter by laser diffraction scattering method) is defined as the particle diameter of the alloy particle.

[Methods for Producing Negative Electrode Active Material, Negative Electrode and Battery]

Methods for producing the aforementioned negative electrode active material containing the alloy particle, and a negative electrode and a battery that include the negative electrode active material will now be described. The method for producing the negative electrode active material includes a process of preparing a molten metal (preparation process), a process of cooling the molten metal to produce an alloy (alloy ingot or thin metal strip) (alloy production process), and a process of performing mechanical alloying on the alloy (mechanical alloying process).

[Preparation Process]

In the preparation process, a molten metal having the aforementioned alloy component is produced. The molten metal is produced by melting raw material by a well-known melting method such as an ingot casting method, arc melting or resistance heating melting.

[Alloy Production Process]

The cooling rate of the aforementioned molten metal is appropriately set. Methods for producing an alloy in the alloy production process include, for example, an ingot casting method, a strip casting method and a melt-spinning method. However, for example, when an alloy is produced by an ingot casting method, in some cases the ε phase and the η' phase those are equilibrium phases are coarse. In such a case, in order to obtain a preferable half width (crystallite diameter), the processing time of the mechanical alloying process that is described later may become long. Therefore, the alloy is preferably produced by rapid cooling. In the present embodiment, in consideration of production efficiency, for example, it is preferable to produce the thin metal strip by rapid cooling using a production apparatus 10 illustrated in FIG. 18. The production apparatus 10 includes a cooling roll 20, a tundish 30 and a blade member 40.

[Cooling Roll]

The cooling roll 20 has an outer peripheral surface, and cools and solidifies the molten metal 50 on the outer peripheral surface while rotating. The cooling roll 20 includes a cylindrical body portion and an unshown shaft portion. The body portion has the aforementioned outer peripheral surface. The shaft portion is disposed at a central axis position of the body portion, and is attached to an unshown driving source. The cooling roll 20 is driven by the driving source to rotate around a central axis 21 of the cooling roll 20.

The starting material of the cooling roll 20 is preferably a material with high hardness and high thermal conductivity. The starting material of the cooling roll 20 is, for example, copper or a copper alloy. Preferably, the starting material of the cooling roll 20 is copper. The cooling roll 20 may also have a coating on the surface thereof. By this means, the hardness of the cooling roll 20 increases. The coating is, for example, a plating coating or a cermet coating. The plating coating is, for example, chrome plating or nickel plating. The cermet coating contains, for example, one or more types selected from a group consisting of tungsten (W), cobalt (Co), titanium (Ti), chromium (Cr), nickel (Ni), silicon (Si), aluminum (Al), and boron (B) as well as carbides, nitrides and carbo-nitrides of these elements. Preferably, the outer layer of the cooling roll 20 is copper, and the cooling roll 20 also has a chrome plating coating on the surface thereof.

Figure 18:
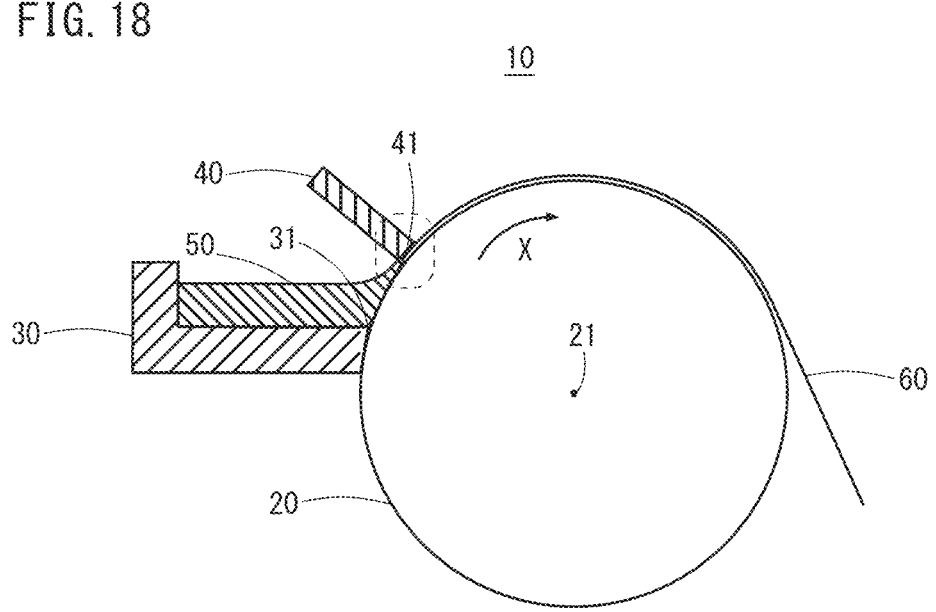
FIG. 18 is a schematic diagram of a production apparatus for producing an alloy of the present embodiment that is preferable.

The character X shown in FIG. 18 denotes the rotational direction of the cooling roll 20. When producing the thin metal strip 60, the cooling roll 20 rotates in the fixed direction X. By this means, in the example illustrated in FIG. 18, a part of the molten metal 50 that contacts the cooling roll 20 is solidified on the outer peripheral surface of the cooling roll 20 and moves accompanying rotation of the cooling roll 20. The peripheral speed of the cooling roll 20 is appropriately set in consideration of the cooling rate of the molten metal 50 and the efficiency of production. If the peripheral speed of the roll is slow, the efficiency of production decreases. If the peripheral speed of the roll is fast, the thin metal strip 60 is liable to peel off from the outer peripheral surface of the cooling roll 20. Consequently, the time period for which the thin metal strip 60 is in contact with the outer peripheral surface of the cooling roll 20 is shortened. In this case, the thin metal strip 60 is air-cooled without being subjected to heat removal by the cooling roll 20. In a case where the thin metal strip 60 is air-cooled, a sufficient cooling rate is not obtained. If a sufficient cooling rate is not obtained, the ε phase and the η' phase those are equilibrium phases will be coarse. In such case, although it is necessary to obtain a preferable half-width (crystallite diameter), it is difficult to adjust the processing conditions of the mechanical alloying process that is described later. Accordingly, a lower limit of the peripheral speed of the roll is preferably 50 m/min, more preferably is 80 m/min, and further preferably is 120 m/min. Although an upper limit of the peripheral speed of the roll is not particularly limited, in consideration of the equipment capacity the upper limit is, for example, 500 m/min. The peripheral speed of the roll can be determined based on the diameter and number of rotations of the cooling roll 20.

A solvent for heat removal may be filled inside the cooling roll 20. By this means, the molten metal 50 can be efficiently cooled. The solvent is, for example, one or more types selected from a group consisting of water, organic solvents and oil. The solvent may be retained inside the cooling roll 20 or may be circulated with the exterior thereof.

[Tundish]

The tundish 30 is capable of receiving the molten metal 50, and supplies the molten metal 50 onto the outer peripheral surface of the cooling roll 20. The shape of the tundish 30 is not particularly limited as long as it is capable of supplying the molten metal 50 onto the outer peripheral surface of the cooling roll 20. The shape of the tundish 30 may be a box shape in which the upper part is open as illustrated in FIG. 18, or may be another shape.

The tundish 30 includes a feed end 31 that guides the molten metal 50 onto the outer peripheral surface of the cooling roll 20. After the molten metal 50 is supplied to the tundish 30 from an unshown crucible, the molten metal 50 is supplied onto the outer peripheral surface of the cooling roll 20 by way of the feed end 31. The shape of the feed end 31 is not particularly limited. A cross-section of the feed end 31 may be a rectangular shape as illustrated in FIG. 18, or may be a shape that has an inclination. The feed end 31 may be a nozzle shape.

Preferably, the tundish 30 is disposed in the vicinity of the outer peripheral surface of the cooling roll 20. By this means the molten metal 50 can be stably supplied onto the outer peripheral surface of the cooling roll 20. A gap between the tundish 30 and the cooling roll 20 is appropriately set within a range such that the molten metal 50 does not leak.

The starting material of the tundish 30 is preferably a refractory material. The tundish 30, for example, contains one or more types of element selected from a group consisting of aluminum oxide ($Al_2O_3$), silicon monoxide (SiO), silicon dioxide ($SiO_2$), chromium oxide ($Cr_2O_3$), magnesium oxide (MgO), titanium oxide ($TiO_2$), aluminum titanate ($Al_2TiO_5$) and zirconium oxide ($ZrO_2$).

[Blade Member]

The blade member 40 is disposed on the downstream side in the rotational direction of the cooling roll 20 relative to the tundish 30, in a manner so that a gap is provided between the blade member 40 and the outer peripheral surface of the cooling roll 20. The blade member 40, for example, is a plate-like member disposed parallel to the axial direction of the cooling roll 20.

Figure 19:
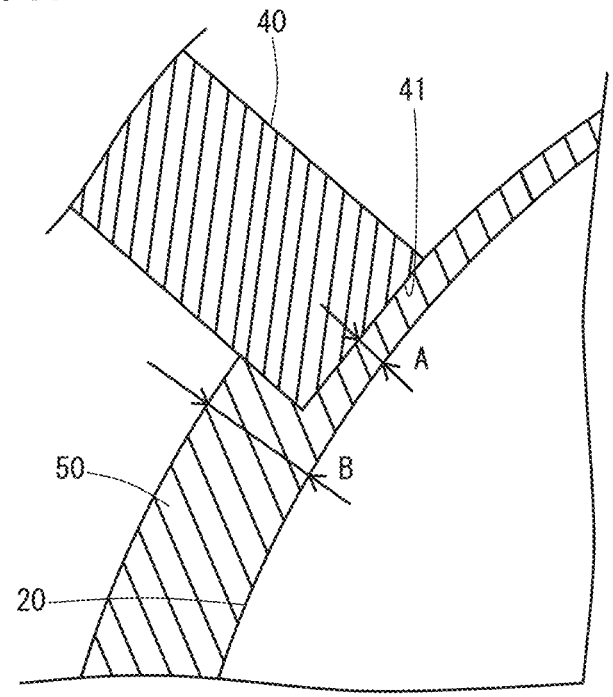
FIG. 19 is an enlarged view of a region indicated by a dashed line in FIG. 18.

FIG. 19 is an enlarged view of the vicinity of the front end (area enclosed by a dashed line in FIG. 18) of the blade member 40 of the production apparatus 10. Referring to FIG. 19, the blade member 40 is disposed in a manner in which a gap A is provided between the blade member 40 and the outer peripheral surface of the cooling roll 20. The blade member 40 regulates the thickness of the molten metal 50 on the outer peripheral surface of the cooling roll 20 so as to be a thickness corresponding to the width of the gap A between the outer peripheral surface of the cooling roll 20 and the blade member 40. Specifically, in some cases a thickness B of the molten metal 50 that is further upstream in the rotational direction of the cooling roll 20 than the blade member 40 is thicker than the width of the gap A. In such a case, the molten metal 50 of an amount (B−A) corresponding to a thickness that is more than the width of the gap A is held back by the blade member 40. By this means, the thickness of the molten metal 50 is thinned to the width of the gap A. The cooling rate of the molten metal 50 increases as a result of the thickness of the molten metal 50 becoming thinner. Therefore, the grains and crystallites of the thin metal strip 60 are refined. In addition, it becomes easier for the $DO_3$ phase that is a metastable phase and the δ phase that is a high-temperature stable phase to be formed.

The width of the gap A is preferably narrower than a thickness B of the molten metal 50 on the outer peripheral surface on the upstream side in the rotational direction of the cooling roll 20 relative to the blade member 40. In this case, the molten metal 50 on the outer peripheral surface of the cooling roll 20 becomes thinner. Therefore, the cooling rate of the molten metal 50 increases further. In such a case, the grains and crystallites of the thin metal strip 60 are more refined. In addition, it becomes easier for the D03 phase that is a metastable phase and the δ phase that is a high-temperature stable phase to be formed.

The width of the gap A between the outer peripheral surface of the cooling roll 20 and the blade member 40 is the shortest distance between the blade member 40 and the outer peripheral surface of the cooling roll 20. The width of the gap A is appropriately set in accordance with the intended cooling rate and efficiency of production. The narrower that the width of the gap A is, the thinner that the thickness of the molten metal 50 becomes after thickness adjustment. Therefore, the narrower that the gap A is, the more that the cooling rate of the molten metal 50 will increase. As a result, it will be easier to make the grains and crystallite of the thin metal strip 60 finer. In addition, it is easier for the D03 phase that is a metastable phase and the δ phase that is a high-temperature stable phase to be formed. Accordingly, the upper limit of the gap A is preferably 100 μm, and more preferably is 50 μm.

On the outer peripheral surface of the cooling roll 20, the distance between a location at which the molten metal 50 is supplied from the tundish 30 and a location at which the blade member 40 is disposed is set as appropriate. It suffices that the blade member 40 is disposed in an area within which the free surface of the molten metal 50 (surface on the side on which the molten metal 50 does not contact the cooling roll 20) comes in contact with the blade member 40 in a liquid or semisolid state.

Figure 20:
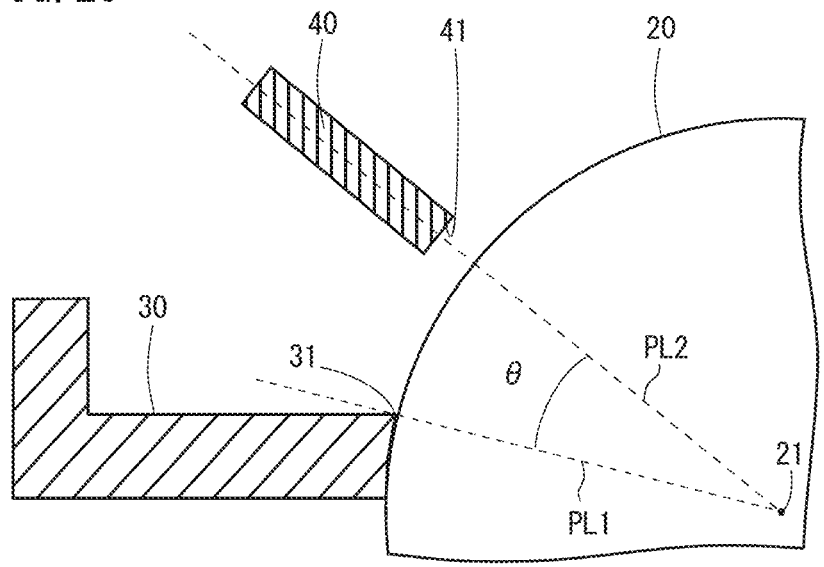
FIG. 20 is a schematic diagram for describing the positional relation between a tundish and a blade member shown in FIG. 18.

FIG. 20 is a view illustrating a mounting angle of the blade member 40. Referring to FIG. 20, for example the blade member 40 is disposed so that an angle θ formed by a plane PL1 that includes the central axis 21 of the cooling roll 20 and the feed end 31 and a plane PL2 that includes the central axis 21 of the cooling roll 20 and the front end portion of the blade member 40 is constant (hereunder, this angle θ is referred to as "mounting angle θ"). The mounting angle θ can be set as appropriate. The upper limit of the mounting angle θ is, for example, 45 degrees. The upper limit of the mounting angle θ is preferably 30 degrees. Although the lower limit of the mounting angle θ is not particularly limited, the mounting angle θ is preferably within a range such that the side face of the blade member 40 does not directly contact the surface of the molten metal 50 on the tundish 30.

Referring to FIG. 18 to FIG. 20, preferably the blade member 40 has a heat removal face 41. The heat removal face 41 is disposed facing the outer peripheral surface of the cooling roll 20. The heat removal face 41 contacts the molten metal 50 that passes through the gap between the outer peripheral surface of the cooling roll 20 and the blade member 40.

The starting material of the blade member 40 is preferably a refractory material. The blade member 40, for example, contains one or more types of element selected from a group consisting of aluminum oxide ($Al_2O_3$), silicon monoxide (SiO), silicon dioxide ($SiO_2$), chromium oxide ($Cr_2O_3$), magnesium oxide (MgO), titanium oxide ($TiO_2$), aluminum titanate ($Al_2TiO_5$) and zirconium oxide ($ZrO_2$). Preferably, the blade member 40 contains one or more types of element selected from a group consisting of aluminum oxide ($Al_2O_3$), silicon dioxide ($SiO_2$), aluminum titanate ($Al_2TiO_5$) and magnesium oxide (MgO).

A plurality of blade members 40 may be disposed consecutively with respect to the rotational direction of the cooling roll 20. In this case, the load applied to a single blade member 40 decreases. In addition, the accuracy with respect to the thickness of the molten metal 50 can be enhanced.

In the production apparatus 10 described above, the thickness of the molten metal 50 on the outer peripheral surface of the cooling roll 20 is regulated by the blade member 40. Therefore, the molten metal 50 on the outer peripheral surface of the cooling roll 20 becomes thin. Because the molten metal 50 becomes thin, the cooling rate of the molten metal 50 increases. Therefore, by using the production apparatus 10 to produce thin metal strips 60, the thin metal strip 60 having more refined grains and crystallites can be produced. In addition, by producing the thin metal strip 60 using the production apparatus 10, the $D0_3$ phase that is a metastable phase and the δ phase that is a high-temperature stable phase can be sufficiently formed. In the case of using the production apparatus 10 described above, a preferable average cooling rate is 100° C./sec or more. The average cooling rate in this case is calculated by the following equation.

Average cooling rate=(molten metal temperature−temperature of thin metal strip when rapid cooling ends)/rapid cooling time period In a case where the thin metal strip is produced by an apparatus that does not include the blade member 40, that is, when strip casting (SC) is performed by the conventional method, the thickness of the molten metal 50 on the outer peripheral surface of the cooling roll 20 cannot be regulated to a thin thickness. In this case, the cooling rate of the molten metal 50 decreases. Therefore, even if mechanical alloying (MA) processing that is described later is executed, the thin metal strip 60 having a fine micro-structure is not obtained. In such case, although it is necessary to obtain a preferable half-width (crystallite diameter), it is difficult to adjust the processing conditions of the mechanical alloying process that is described later.

In addition, in a case where the thin metal strip is produced by an apparatus that does not include the blade member 40, it is necessary to make the peripheral speed of the cooling roll 20 fast in order to reduce the thickness of the molten metal 50 on the outer peripheral surface of the cooling roll 20. If the peripheral speed of the roll is fast, the thin metal strip 60 will quickly peel off from the outer peripheral surface of the cooling roll 20. That is, a time period for which the thin metal strip 60 contacts the outer peripheral surface of the cooling roll 20 will shorten. In this case, the thin metal strip 60 will not be subjected to heat removal by the cooling roll 20, and will be air-cooled. In a case where the thin metal strip 60 is air-cooled, a sufficient average cooling rate is not obtained. Consequently, the thin metal strip 6 having a fine micro-structure is not obtained. In such case, although it is necessary to obtain a preferable half-width (crystallite diameter), it is difficult to adjust the processing conditions of the mechanical alloying process that is described later.

[Mechanical Alloying (MA) Process]

The alloy (alloy ingot or thin metal strip 60) that was produced is subjected to mechanical alloying (MA) processing to obtain the alloy particle. As a result of an alloying effect caused by the mechanical alloying (MA) processing, Si is liberated from the aforementioned alloy (Cu—Sn—Si alloy) and reacts with oxygen contained in an oxygen source that is described later, and an SiOx phase (x=0.50 to 1.70) is thereby formed. The constituent phases of the alloy particle thus change to constituent phases that contain one type or two types of phase selected from a group consisting of an $D0_3$ phase and an δ phase, one type or two types of phase selected from a group consisting of an ε phase and an η' phase, and an SiOx phase (x=0.50 to 1.70). By this means, the alloy particle having the desired constituent phases are obtained. In addition, as a result of the mechanical alloying (MA) processing, the crystallite of the alloy particle becomes additionally smaller, and is adjusted to a desired half-width.

The alloy (alloy ingot or thin metal strip 60) may be subjected to preliminary pulverization prior to the mechanical alloying (MA) processing. In the preliminary pulverization, a normal ball mill or a vibratory ball mill, an attritor, a pin mill and a disk mill may be used. An example of the vibratory ball mill is a device with the trade name "mixer mill MM400" manufactured by Verder Scientific Co., Ltd.

The mechanical alloying (MA) processing is performed by the following procedure. First, the alloy (alloy ingot or thin metal strip 60) is inserted together with balls and an oxygen source into a mechanical alloying (MA) device such as an attritor or a vibratory ball mill.

The oxygen source is, for example, an organic compound containing oxygen. If the proportion of oxygen in the chemical composition of the organic compound containing oxygen is high, oxygen can be efficiently supplied. The proportion of oxygen in the organic compound containing oxygen is, for example, more than 6:1 with respect to a ratio of C:O.

The oxygen source is preferably a solid organic compound having a molecular weight of 1000 or more. In the present embodiment, dry mechanical alloying (MA) processing using a solid oxygen source is performed. If an oxygen source with a low molecular weight is used, there is a risk of volatilization. If dry mechanical alloying (MA) processing using a solid oxygen source having a molecular weight of 1000 or more is performed, mechanical alloying (MA) processing can be safely carried out even under the mechanical alloying (MA) conditions described below. If the oxygen source is a liquid, in some cases the energy may become too large.

The organic compound containing oxygen is, for example, polyethylene glycol (PEG). PEG is a liquid when the average molecular weight thereof is less than 1000. PEG is a solid when the molecular weight thereof is 1000 or more.

A preferable added amount of the oxygen source is in a range of 0.5 to 7 mass % with respect to the mass of the alloy. However, the added amount may be changed depending on the model type of the mechanical alloying (MA) device, the atmosphere control and the processing time. The added amount of the oxygen source is appropriately adjusted after confirming the oxygen content in the produced alloy particle. If the added amount of the oxygen source is approximately within the aforementioned added amount range (0.5 to 7 mass %), it is easy to adjust the oxygen content of the alloy particle to within the appropriate range, and it is easy to finely form SiOx (x=0.50 to 1.70) in the alloy particle.

Next, mechanical alloying (MA) processing in which the alloy in the mechanical alloying (MA) device is subjected to pulverization with high energy, and the as-pulverized alloy particles are then subjected to compression-bonding is repeatedly performed.

The mechanical alloying (MA) device is, for example, a high-speed planetary mill. An example of a high-speed planetary mill is a high-speed planetary mill with the trade name "High G BX" that is manufactured by Kurimoto Ltd. Preferable production conditions employed at the mechanical alloying (MA) device are as described hereunder.

When producing the alloy particle by mechanical alloying (MA) processing, the production conditions employed at the mechanical alloying (MA) device such as the centrifugal acceleration, the mass ratio of balls to the thin metal strip that is the raw material, and the mechanical alloying (MA) processing time period are important. If the production conditions employed at the aforementioned mechanical alloying (MA) device are, for example, as described hereunder, the alloy particle of the present embodiment which contain one type or two types of phase selected from a group consisting of a phase having a $D0_3$ structure in Strukturbericht notation in which an Si content is in a range of 0 to 5.0 at % and a δ phase in which an Si content is in a range of 0 to 5.0 at %, one type or two types of phase selected from a group consisting of an ε phase in which an Si content is in a range of 0 to 5.0 at % and an η' phase in which an Si content is in a range of 0 to 5.0 at %, and an SiOx phase (x=0.50 to 1.70), and which have, in an X-ray diffraction profile, a peak having a largest integrated diffraction intensity in a range of 42.0 to 44.0 degrees of a diffraction angle 2θ, with a half-width of the peak being in a range of 0.15 to 2.5 degrees, can be produced.

Centrifugal acceleration: 13 to 150 G (corresponds to a rotational speed of 200 to 689 rpm in the high-speed planetary mill with the trade name "High G BX")

If the centrifugal acceleration is too small, the half-width will decrease because the crystallite diameter will increase. Furthermore, if the centrifugal acceleration is too small, the amorphous SiOx phase (x=0.50 to 1.70) will not be obtained. In other words, it means that a coarse crystalline Si phase will be formed in the alloy particle. In this case, the degree of expansion and contraction of the negative electrode active material will increase during charging and discharging, and the capacity retention ratio will decrease.

If the centrifugal acceleration is too large, the half-width will increase because the crystallite diameter will decrease. Furthermore, if the centrifugal acceleration is too large, the alloy particle will become amorphous. If the alloy particle becomes amorphous, a phase having a $D0_3$ structure, a δ phase, an ε phase and an η' phase will not be obtained. As a result, the capacity per volume and capacity retention ratio of the negative electrode active material will decrease. Accordingly, a preferable centrifugal acceleration is in the range of 13 to 150 G. A more preferable lower limit of the centrifugal acceleration is 30 G. A more preferable upper limit of the centrifugal acceleration is 95 G. The centrifugal acceleration can be adjusted by adjusting the rotational speed of the mechanical alloying (MA) device. The term "rotational speed" refers to the number of revolutions of the turntable of the mechanical alloying (MA) device.

Ball Ratio: 5 to 80

The term "ball ratio" refers to the mass ratio of balls with respect to the thin metal strip that serves as the raw material, and is defined by the following equation.

(Ball ratio)=(ball mass)/(mass of alloy ingot or thin metal strip 60)

If the ball ratio is too small, the half-width will be small because the crystallite diameter will increase. On the other hand, if the ball ratio is too large, the half-width will be large because the crystallite diameter will decrease. Accordingly, a preferable ball ratio is in a range of 5 to 80. A more preferable lower limit of the ball ratio is 10, and more preferably is 12. A more preferable upper limit of the ball ratio is 60, and more preferably is 40.

Note that, for example, SUJ2 defined in JIS Standard is used as the starting material for the balls. The diameter of the balls is, for example, from 0.8 mm to 10 mm.

Mechanical Alloying (MA) Processing Time Period: 1 to 48 Hours

The mechanical alloying processing time period is defined as "MA processing time period". If the MA processing time period is short, the half-width will be small because the crystallite diameter will increase. Furthermore, if the MA processing time period is short, an amorphous SiOx phase (x=0.50 to 1.70) will not be obtained. In other words, it means that a coarse crystalline Si phase will be formed in the alloy particle. In this case, the degree of expansion and contraction of the negative electrode active material will increase during charging and discharging, and the capacity retention ratio will decrease. On the other hand, if the MA processing time period is too long, the half-width will be large because the crystallite diameter will decrease. Furthermore, if the MA processing time period is long, the alloy particle will become amorphous. If the alloy particle becomes amorphous, a phase having a $D0_3$ structure, a δ phase, an ε phase and an η' phase will not be obtained. Consequently, the capacity per volume and capacity retention ratio of the negative electrode active material will decrease. Accordingly, a preferable MA treatment time is in the range of 1 to 48 hours. A preferable lower limit of the MA treatment time is 2 hours, and more preferably is 4 hours. A preferable upper limit of the MA treatment time is 36 hours, and more preferably is 24 hours. Note that, a unit stopping time which is described later is not included in the MA treatment time.

Cooling Condition During MA Processing: Stop for 30 Minutes or More per 3 Hours of MA Processing (Intermittent Operation)

If the temperature of the alloy particle becomes too high during the MA processing, the crystallites will be large, and consequently the half-width will be small. A preferable temperature of the chiller cooling water of the device during MA treatment is in a range of 1 to 25° C.

In addition, the total stopping time per 3 hours of mechanical alloying (MA) treatment (hereinafter, referred to as "unit stopping time") is set to be not less than 30 minutes. In a case where the mechanical alloying (MA) treatment is performed continuously, even if the chiller cooling water is adjusted to within the aforementioned range, the temperature of the alloy particle will be too high and the crystallites will be large. If the unit stopping time is not less than 30 minutes, the occurrence of a situation in which the temperature of the alloy particle becomes excessively high can be suppressed, and enlargement of the crystallite diameter can also be suppressed.

The alloy particle is produced by the above processes. If necessary, in the mechanical alloying (MA) processing, another active material (graphite) is added in addition to the alloy (alloy ingot or thin metal strip 60) and the oxygen source. A negative electrode active material is produced by the above processes. Accordingly, as described above, the negative electrode active material may be a material composed of the alloy particles and impurities, or may contain another active material (for example, graphite) in addition to the alloy particles.

[Method for Producing Negative Electrode]

A negative electrode that uses the negative electrode active material according to the present embodiment can be produced, for example, by the following well-known method.

A binder such as polyvinylidene fluoride (PVDF), polymethyl methacrylate (PMMA), polytetrafluoroethylene (PTFE) or styrene-butadiene rubber (SBR) is mixed with the aforementioned negative electrode active material to produce a mixture. Furthermore, to impart sufficient conductivity to the negative electrode, carbon material powder such as natural graphite, artificial graphite or acetylene black is mixed in the aforementioned mixture to produce a negative electrode compound. After dissolving the binder by adding a solvent such as N-methylpyrrolidone (NMP), dimethylformamide (DMF) or water, the negative electrode compound is sufficiently agitated using a homogenizer or glass beads if necessary to thereby form the negative electrode compound into a slurry. The slurry is applied onto a support body such as rolled copper foil or an electrodeposited copper foil and is dried. Thereafter, the dried product is subjected to pressing. A negative electrode is produced by the above processes.

From the viewpoint of the mechanical strength and battery characteristics of the negative electrode, the amount of the binder to be admixed is preferably in a range of 1 to 10 mass % relative to the amount of the negative electrode compound. The support body is not limited to a copper foil. The support body may be, for example, a thin foil of another metal such as stainless steel or nickel, a net-like sheet punching plate, or a mesh braided with a metal element wire or the like.

[Method for Producing Battery]

A nonaqueous electrolyte secondary battery according to the present embodiment includes the negative electrode as described above, a positive electrode, a separator, and an electrolytic solution or electrolyte. The shape of the battery may be cylindrical or a square shape, or may be a coin shape or a sheet shape or the like. The battery of the present embodiment may also be a battery that utilizes a solid electrolyte, such as a polymer battery.

In the battery of the present invention, it suffices that the negative electrode active material in a discharged state satisfies the requirements specified for the negative electrode active material of the present invention.

A well-known positive electrode may be used as the positive electrode of the battery of the present embodiment. The positive electrode preferably contains a lithium (Li)-containing transition-metal compound as the active material. The Li-containing transition-metal compound is, for example, $LiM_{1-x}M'_xO_2$ or $LiM_2yM'O_4$. Where, in the chemical Formulae, $0 \leq x$, $y \leq 1$, and M and M' are respectively one or more types of element selected from a group consisting of barium (Ba), cobalt (Co), nickel (Ni), manganese (Mn), chromium (Cr), titanium (Ti), vanadium (V), iron (Fe), zinc (Zn), aluminum (Al), indium (In), tin (Sn), scandium (Sc) and yttrium (Y).

The battery of the present embodiment may use other well-known positive electrode materials such as a transition metal chalcogenide; vanadium oxide and a lithium (Li) compound thereof; niobium oxide and a lithium compound thereof; a conjugated polymer that uses an organic conductive substance; a Chevrel-phase compound; activated carbon, and an activated carbon fiber.

The electrolytic solution or electrolyte of the battery of the present embodiment is generally a well-known nonaqueous electrolytic solution in which lithium salt as the supporting electrolyte is dissolved into an organic solvent. The lithium salt is, for example, one or more types selected from the group consisting of $LiClO_4$, $LiBF_4$, $LiPF_6$, $LiAsF_6$, $LiB(C_6H_5)$, $LiCF_3SO_3$, $LiCH_3SO_3$, $Li(CF_3SO_2)_2N$, $LiC_4F_9SO_3$, $Li(CF_2SO_2)_2$, $LiCl$, $LiBr$ and $LiI$.

Preferably, the organic solvent is one or more types selected from the group consisting of carbonic esters, carboxylate esters and ethers. A carbonic ester is, for example, one or more types of element selected from a group consisting of propylene carbonate, ethylene carbonate, ethyl methyl carbonate, dimethyl carbonate and diethyl carbonate.

The separator is disposed between the positive electrode and the negative electrode. The battery of the present embodiment may include a well-known separator. The separator is, for example, one type or two types selected from the group consisting of a polyolefin non-woven fabric and a glass filter. The polyolefin non-woven fabric is, for example, one type or two types selected from the group consisting of a polypropylene non-woven fabric and a polyethylene non-woven fabric.

The above described negative electrode, positive electrode, separator, and electrolytic solution or electrolyte are enclosed in a container for a battery, to thereby produce a battery. The battery of the present embodiment can be produced by the process described above.

Hereinafter, the negative electrode active material, the negative electrode, and the battery of the present embodiment described above will be described in more detail using examples. Note that the negative electrode active material, the negative electrode, and the battery of the present embodiment are not limited to the examples described below.

EXAMPLES

With respect to the compositions of Test Nos. 1 to 30 shown in Table 5, a negative electrode active material, a negative electrode, and a coin battery were produced under the conditions described hereunder. The values for the following items were investigated with regard to the negative electrode active material of each Test No. shown in Table 6: oxygen content; constituent phases; Si content of $DO_3$ phase, $\delta$ phase, $\epsilon$ phase, $\eta'$ phase and SiOx phase (x=0.50 to 1.70) (the x value with respect to the SiOx phase); most intense diffraction line peak; half-width; crystallite diameter; and mean particle diameter of SiOx phase (x=0.50 to 1.70). Further, the initial discharge capacity, initial efficiency and capacity retention ratio were investigated with regard to a coin battery produced from the negative electrode active material of each Test No.

Note that, in order to confirm that changes did not arise in the most intense diffraction line peak and the half-width even after discharging after charge and discharge cycles, X-ray diffraction measurement was performed for each Test No. (excluding Test No. 22) shown in Table 6 before charging, after 10 cycles of charging, and after 10 cycles of discharging. Based on the obtained X-ray profiles, changes in the most intense diffraction line peak and half-width after 10 cycles of discharging, and changes in the X-ray diffraction profile after 10 cycles of charging were investigated.

TABLE 5

| Test No. | Chemical Composition of Alloy Component | Melted Raw Material (g) | | | | | | | | | | | | |
|---|---|---|---|---|---|---|---|---|---|---|---|---|---|---|
| | | Cu | Sn | Si | Ti | V | Cr | Mn | Fe | Co | Ni | Zn | Al | B | C |
| 1 | Cu-20.0 at % Sn-8.0 at % Si | 637.8 | 330.9 | 31.3 | — | — | — | — | — | — | — | — | — | — | — |
| 2 | Cu-20.0 at % Sn-28.0 at % Si | 511.1 | 367.2 | 121.7 | — | — | — | — | — | — | — | — | — | — | — |
| 3 | Cu-15.0 at % Sn-38.0 at % Si | 511.9 | 305.2 | 182.9 | — | — | — | — | — | — | — | — | — | — | — |
| 4 | Cu-15.0 at % Sn-8.0 at % Si | 709.3 | 258.1 | 32.6 | — | — | — | — | — | — | — | — | — | — | — |
| 5 | Cu-38.0 at % Sn-38.0 at % Si | 214.7 | 635.0 | 150.3 | — | — | — | — | — | — | — | — | — | — | — |
| 6 | Cu-38.0 at % Sn-8.0 at % Si | 420.2 | 552.3 | 27.5 | — | — | — | — | — | — | — | — | — | — | — |
| 7 | Cu-15.0 at % Sn-28.0 at % Si | 585.3 | 287.7 | 127.1 | — | — | — | — | — | — | — | — | — | — | — |
| 8 | Cu-28.0 at % Sn-28.0 at % Si | 404.9 | 481.2 | 113.9 | — | — | — | — | — | — | — | — | — | — | — |
| 9A-9J | Cu-28.0 at % Sn-16.0 at % Si | 485.4 | 453.3 | 61.3 | — | — | — | — | — | — | — | — | — | — | — |
| 10 | Cu-20.0 at % Sn-16.0 at % Si | 590.2 | 344.5 | 65.2 | — | — | — | — | — | — | — | — | — | — | — |
| 11 | Cu-28.0 at % Sn-16.0 at % Si-1.0 at % Ti | 477.7 | 454.3 | 61.4 | 6.54 | — | — | — | — | — | — | — | — | — | — |
| 12 | Cu-28.0 at % Sn-16.0 at % Si-1.0 at % V | 477.5 | 454.1 | 61.4 | — | 6.96 | — | — | — | — | — | — | — | — | — |
| 13 | Cu-28.0 at % Sn-16.0 at % Si-1.0 at % Cr | 477.5 | 454.0 | 61.4 | — | — | 7.10 | — | — | — | — | — | — | — | — |
| 14 | Cu-28.0 at % Sn-16.0 at % Si-1.0 at % Mn | 477.3 | 453.8 | 61.4 | — | — | — | 7.50 | — | — | — | — | — | — | — |
| 15 | Cu-28.0 at % Sn-16.0 at % Si-1.0 at % Fe | 477.2 | 453.8 | 61.4 | — | — | — | — | 7.63 | — | — | — | — | — | — |
| 16 | Cu-28.0 at % Sn-16.0 at % Si-1.0 at % Co | 477.0 | 453.6 | 61.3 | — | — | — | — | — | 8.04 | — | — | — | — | — |
| 17 | Cu-28.0 at % Sn-16.0 at % Si-2.0 at % Ni | 468.7 | 453.9 | 61.4 | — | — | — | — | — | — | 16.03 | — | — | — | — |
| 18 | Cu-28.0 at % Sn-16.0 at % Si-2.0 at % Zn | 467.8 | 453.1 | 61.3 | — | — | — | — | — | — | — | 17.83 | — | — | — |
| 19 | Cu-28.0 at % Sn-16.0 at % Si-2.0 at % Al | 472.8 | 457.9 | 61.9 | — | — | — | — | — | — | — | — | 7.43 | — | — |
| 20 | Cu-28.0 at % Sn-16.0 at % Si-1.0 at % B | 480.2 | 456.6 | 61.7 | — | — | — | — | — | — | — | — | — | 1.49 | — |
| 21 | Cu-28.0 at % Sn-16.0 at % Si-1.0 at % C | 480.1 | 456.5 | 61.7 | — | — | — | — | — | — | — | — | — | — | 1.65 |
| 22 | 100% Si | — | — | — | — | — | — | — | — | — | — | — | — | — | — |
| 23 | Cu-50.0 at % Sn-2.0 at % Si | 337.4 | 656.4 | 6.2 | — | — | — | — | — | — | — | — | — | — | — |
| 24 | Cu-45.0 at % Sn-45.0 at % Si | 87.8 | 737.7 | 174.6 | — | — | — | — | — | — | — | — | — | — | — |
| 25 | Cu-15.0 at % Sn-50.0 at % Si | 411.2 | 329.2 | 259.6 | — | — | — | — | — | — | — | — | — | — | — |
| 26 | Cu-4.0 at % Sn-2.0 at % Si | 918.4 | 73.0 | 8.6 | — | — | — | — | — | — | — | — | — | — | — |
| 27 | Cu-5.0 at % Sn-50.0 at % Si | 588.7 | 122.2 | 289.1 | — | — | — | — | — | — | — | — | — | — | — |

TABLE 5-continued

| Test No. | Chemical Composition of Alloy Component | Melted Raw Material (g) | | | | | | | | | | | | | |
|---|---|---|---|---|---|---|---|---|---|---|---|---|---|---|---|
| | | Cu | Sn | Si | Ti | V | Cr | Mn | Fe | Co | Ni | Zn | Al | B | C |
| 28 | Cu-5.0 at % Sn-8.0 at % Si | 871.1 | 93.5 | 35.4 | — | — | — | — | — | — | — | — | — | — | — |
| 29 | Cu-50.0 at % Sn-8.0 at % Si | 302.3 | 672.2 | 25.5 | — | — | — | — | — | — | — | — | — | — | — |
| 30 | Cu-14.0 at % Sn-4.0 at % Si | 746.0 | 237.9 | 16.1 | — | — | — | — | — | — | — | — | — | — | — |

TABLE 6

| Test No. | MA Condition | Chemical Composition of Alloy Component (at %) | Negative Electrode Active Material - Constituent Phases - Oxygen Content (mass %) | DO₃ Phase | ε Phase, δ Phase, η' Phase | SiOx Phase | Other | Content of DO₃ Phase Si (at %) | Content of δ Phase Si (at %) | Content of ε Phase Si (at %) | Content of η' Phase Si (at %) | x Value of SiOx Phase | Most Intense Diffraction Line Peak (degree) | Half-width (Δ2θ/degree) | Crystallite Diameter (nm) | Particle Diameter of SiOx Phase (nm) | Initial Discharge Capacity (mAh/cm³) | Initial Efficiency (%) | Capacity Retention Ratio (%) |
|---|---|---|---|---|---|---|---|---|---|---|---|---|---|---|---|---|---|---|---|
| 1 | 1 | Cu-20.0 at % Sn-8.0 at % Si | 1.71 | DO₃, δ | ε, η' | SiOx | — | 1.2 | 1.4 | 1.9 | 4.5 | 1.39 | 42.96 | 1.19 | 7.8 | 16.4 | 469.9 | 82.6 | 85.8 |
| 2 | 1 | Cu-20.0 at % Sn-28.0 at % Si | 1.74 | DO₃, δ | ε, η' | SiOx | — | 1.9 | 2.8 | 2.6 | 1.8 | 0.96 | 42.93 | 1.20 | 7.8 | 15.3 | 619.0 | 85.2 | 84.3 |
| 3 | 1 | Cu-15.0 at % Sn-38.0 at % Si | 1.84 | DO₃, δ | ε, η' | SiOx | — | 3.6 | 3.8 | 1.2 | 1.3 | 0.72 | 42.99 | 1.15 | 8.1 | 16.4 | 585.3 | 83.9 | 85.0 |
| 4 | 1 | Cu-15.0 at % Sn-8.0 at % Si | 1.69 | δ | ε | SiOx | — | — | 1.1 | 1.4 | — | 1.43 | 43.02 | 1.07 | 8.7 | 20.7 | 401.2 | 80.1 | 86.9 |
| 5 | 1 | Cu-38.0 at % Sn-8.0 at % Si | 1.30 | DO₃, δ | ε, η' | SiOx | — | 4.6 | 4.3 | 2.8 | 2.9 | 1.35 | 42.88 | 1.27 | 7.3 | 14.6 | 629.0 | 83.1 | 85.2 |
| 6 | 1 | Cu-38.0 at % Sn-8.0 at % Si | 1.84 | DO₃, δ | ε, η' | SiOx | — | 1.5 | 1.4 | 1.1 | 1.2 | 0.94 | 42.86 | 1.33 | 7.0 | 13.8 | 586.9 | 82.0 | 85.7 |
| 7 | 1 | Cu-15.0 at % Sn-28.0 at % Si | 1.71 | δ | ε | SiOx | — | — | 3.6 | 3.0 | — | 1.12 | 42.94 | 1.26 | 7.4 | 15.6 | 609.5 | 84.9 | 83.2 |
| 8 | 1 | Cu-28.0 at % Sn-16.0 at % Si | 1.72 | DO₃ | ε, η' | SiOx | — | 3.8 | — | 2.6 | 2.5 | 1.03 | 43.00 | 1.13 | 8.3 | 19.7 | 632.2 | 87.2 | 82.8 |
| 9A | 1 | Cu-28.0 at % Sn-16.0 at % Si | 1.67 | DO₃ | ε, η' | SiOx | — | 2.1 | — | 1.6 | 1.3 | 0.84 | 43.10 | 1.24 | 7.5 | 8.6 | 622.9 | 84.4 | 84.1 |
| 9B | 7 | Cu-28.0 at % Sn-16.0 at % Si | 0.61 | DO₃, δ | ε, η' | SiOx | — | 4.5 | 4.2 | 2.6 | 2.1 | 0.55 | 42.95 | 1.20 | 7.8 | 15.8 | 562.2 | 84.2 | 83.2 |
| 9C | 8 | Cu-28.0 at % Sn-16.0 at % Si | 2.76 | DO₃, δ | ε, η' | SiOx | — | 2.0 | 2.2 | 1.6 | 1.3 | 1.45 | 42.97 | 1.19 | 7.8 | 14.3 | 618.0 | 86.4 | 82.2 |
| 9D | 10 | Cu-28.0 at % Sn-16.0 at % Si | 1.70 | DO₃, δ | ε, η' | SiOx | — | 3.8 | 3.4 | 2.9 | 2.6 | 0.78 | 43.01 | 0.74 | 12.9 | 102.3 | 622.9 | 86.6 | 80.1 |
| 10 | 1 | Cu-20.0 at % Sn-16.0 at % Si | 1.59 | δ | ε | SiOx | — | — | 2.6 | 1.8 | — | 0.88 | 42.97 | 1.07 | 8.7 | 13.0 | 596.9 | 83.9 | 83.2 |
| 11 | 1 | Cu-28.0 at % Sn-16.0 at % Si | 1.84 | DO₃, δ | ε, η' | SiOx | — | 2.5 | 1.9 | 1.1 | 1.2 | 1.03 | 42.93 | 1.29 | 7.2 | 12.6 | 585.5 | 84.2 | 82.8 |
| 12 | 1 | Cu-28.0 at % Sn-16.0 at % Si-1.0 at % Ti | 1.91 | DO₃, δ | ε, η' | SiOx | — | 2.9 | 2.1 | 1.2 | 1.1 | 0.97 | 42.94 | 1.28 | 7.2 | 14.7 | 598.1 | 84.0 | 84.6 |
| 13 | 1 | Cu-28.0 at % Sn-16.0 at % Si-1.0 at % V | 1.31 | DO₃, δ | ε, η' | SiOx | — | 2.1 | 2.3 | 1.6 | 0.8 | 0.89 | 42.99 | 1.30 | 7.1 | 21.6 | 603.9 | 84.5 | 83.7 |
| 14 | 1 | Cu-28.0 at % Sn-16.0 at % Si-1.0 at % Cr | 2.07 | DO₃, δ | ε, η' | SiOx | — | 1.9 | 2.6 | 1.3 | 0.9 | 1.24 | 42.98 | 1.04 | 9.0 | 22.7 | 613.9 | 85.0 | 83.3 |
| 15 | 1 | Cu-28.0 at % Sn-16.0 at % Si-1.0 at % Mn Si-1.0 at % Fe | 2.12 | DO₃, δ | ε, η' | SiOx | — | 2.4 | 2.4 | 1.4 | 1.5 | 1.11 | 42.95 | 1.07 | 8.7 | 25.3 | 600.1 | 83.9 | 82.0 |

TABLE 6-continued

| | | | | | | | | | | | | | | | | | | | |
|---|---|---|---|---|---|---|---|---|---|---|---|---|---|---|---|---|---|---|---|
| 16 | 1 | Cu-28.0 at % Sn-16.0 at % Si-1.0 at % Co | 1.11 | D0₃, δ | ε, η' | SiOx | — | 2.0 | 2.0 | 1.1 | 1.3 | 0.79 | 43.02 | 1.16 | 8.0 | 17.6 | 609.8 | 83.7 | 83.9 |
| 17 | 1 | Cu-28.0 at % Sn-16.0 at % Ni | 1.58 | D0₃, δ | ε, η' | SiOx | — | 2.6 | 2.7 | 0.9 | 1.0 | 0.85 | 42.89 | 1.14 | 8.2 | 21.9 | 598.1 | 82.9 | 84.6 |
| 18 | 1 | Cu-2.0 at % Sn-16.0 at % Zn | 1.96 | D0₃, δ | ε, η' | SiOx | — | 2.3 | 2.1 | 1.4 | 1.9 | 1.06 | 42.91 | 1.18 | 7.9 | 18.6 | 599.2 | 82.5 | 83.3 |
| 19 | 1 | Cu-2.0 at % Sn-16.0 at % Al | 2.09 | D0₃, δ | ε, η' | SiOx | — | 2.6 | 2.6 | 1.2 | 1.6 | 1.14 | 42.87 | 1.21 | 7.7 | 17.4 | 598.5 | 83.0 | 83.5 |
| 20 | 1 | Cu-2.0 at % Sn-16.0 at % B | 1.55 | D0₃, δ | ε, η' | SiOx | — | 2.3 | 2.4 | 1.3 | 1.8 | 0.99 | 43.08 | 1.31 | 7.1 | 16.0 | 608.0 | 83.9 | 84.4 |
| 21 | 1 | Cu-28.0 at % Sn-16.0 at % C | 2.01 | D0₃, δ | ε, η' | SiOx | — | 2.8 | 2.3 | 1.8 | 1.0 | 1.06 | 43.02 | 1.38 | 6.7 | 13.6 | 590.6 | 83.2 | 83.2 |
| 9E | 2 | Cu-28.0 at % Sn-16.0 at % Si | 1.85 | D0₃, δ | ε, η' | — | Sn | 14.6 | 13.1 | 6.5 | 5.7 | — | 42.97 | 0.13 | 111.5 | — | 321.3 | 54.9 | 88.3 |
| 9F | 3 | Cu-28.0 at % Sn-16.0 at % Si | 1.58 | D0₃, δ | ε, η' | — | Sn | 13.9 | 13.6 | 5.8 | 5.3 | — | 42.98 | 0.14 | 99.1 | — | 311.0 | 76.7 | 88.2 |
| 9G | 4 | Cu-28.0 at % Sn-16.0 at % Si | 1.72 | D0₃ | — | SiOx | — | 3.1 | — | 2.3 | 2.2 | 0.56 | 42.97 | 3.64 | 2.5 | 2.7 | 591.0 | 82.3 | 24.9 |
| 9H | 5 | Cu-28.0 at % Sn-16.0 at % Si | 1.68 | D0₃, δ | ε, η' | — | Sn | 15.3 | 14.6 | 5.9 | 5.3 | — | 42.95 | 0.13 | 111.5 | — | 300.9 | 60.0 | 87.2 |
| 9I | 6 | Cu-28.0 at % Sn-16.0 at % Si | 0.28 | D0₃, δ | ε, η' | — | Sn | 12.6 | 11.6 | 5.3 | 5.2 | — | 42.81 | 1.13 | 8.3 | — | 311.0 | 61.7 | 86.9 |
| 9J | 9 | Cu-28.0 at % Sn-16.0 at % Si | 3.84 | D0₃, δ | ε, η' | SiOx | — | 0.9 | 1.1 | 0.6 | 0.3 | 1.74 | 42.78 | 1.23 | 7.6 | 11.6 | 623.5 | 86.1 | 40.5 |
| 22 | — | 100% Si | — | — | — | — | Si (XRD) | — | — | — | — | — | — | — | — | — | 1101.9 | 56.7 | 10.2 |
| 23 | 1 | Cu-50.0 at % Sn | 1.72 | — | ε, η' | — | Sn | — | — | — | 5.7 | — | 42.80 | 1.38 | 6.7 | 11.3 | 541.9 | 66.4 | 48.7 |
| 24 | 1 | Cu-45.0 at % Sn-2.0 at % Si | 1.71 | — | ε, η' | SiOx | — | — | — | 5.8 | 5.4 | 1.33 | 43.08 | 1.07 | 8.7 | 13.5 | 652.5 | 67.4 | 22.2 |
| 25 | 1 | Cu-45.0 at % Sn-50.0 at % Si | 1.67 | D0₃ | — | SiOx | Cu—Si Compound fcc-Cu | 5.6 | 6.3 | — | — | 0.65 | 42.86 | 1.28 | 7.2 | 14.7 | 300.7 | 59.5 | 80.0 |
| 26 | 1 | Cu-15.0 at % Sn | 1.70 | — | — | — | — | — | — | — | — | — | 43.05 | 1.08 | 8.7 | 15.8 | 25.2 | 44.7 | 88.6 |
| 27 | 1 | Cu-4.0 at % Sn-50.0 at % Si | 2.39 | δ | ε, η' | SiOx | Cu—Si Compound | — | 6.9 | — | — | 1.46 | 42.93 | 1.22 | 7.6 | 14.0 | 66.9 | 47.7 | 86.6 |
| 28 | 1 | Cu-5.0 at % Sn-50.0 at % Si | 2.07 | δ | — | SiOx | — | — | 3.6 | — | — | 0.87 | 42.96 | 1.20 | 7.8 | 13.0 | 55.7 | 45.7 | 85.9 |
| 29 | 1 | Cu-5.0 at % Sn-8.0 at % Si | 1.87 | — | ε, η' | SiOx | — | — | — | 5.9 | 5.6 | 1.21 | 42.94 | 1.23 | 7.6 | 17.9 | 659.2 | 85.1 | 19.7 |
| 30 | 1 | Cu-50.0 at % Sn-8.0 at % Si | 2.05 | D0₃, δ | — | — | — | 3.6 | 3.5 | — | — | — | 42.86 | 1.27 | 7.3 | 17.9 | 171.6 | 53.9 | 86.6 |

The methods for producing the negative electrode active material, negative electrode and coin battery of each Test No other than Test No. 22 were as follows. Note that, in Test No. 22, other than the fact that a powder reagent of pure Si was pulverized using an automatic mortar and used as a negative electrode active material, the negative electrode and coin battery were produced in the same manner as for the other Test Nos.

[Production of Alloy Particle]
[Preparation Process]

Molten metal was produced so that the chemical compositions of the alloy component became the chemical compositions of alloy component shown in Table 5. For example, in the case of Test No. 1, molten metal was produced so that the alloy component contained Cu-20.0 at % Sn-8.0 at % Si, that is, 20.0 at % of Sn and 8.0 at % of Si, with the balance being Cu and impurities. The molten metal was produced by subjecting a raw material containing the metals (unit is g) shown in the "melted raw material" column in Table 5 to high-frequency melting. Note that, in Test No. 22, because a powder reagent of pure Si was used as a negative electrode active material, a melted raw material was not produced.

[Alloy Production Process]

After stabilizing the molten metal at 1200° C., the molten metal was rapidly cooled according to the condition described below, and a thin metal strip having a thickness of 75 μm was cast.

As a cooling condition, the thin metal strip was produced by the strip casting (SC) method of the aforementioned embodiment using the production apparatus shown in FIG. 18. Specifically, a water-cooled cooling roll made of copper was used. The rotational speed of the cooling roll was set as 300 meters per minute with respect to the circumferential speed of the roll surface. In an argon atmosphere, the aforementioned molten metal was supplied onto the rotating water-cooled roll through a horizontal tundish (made of alumina). The molten metal was dragged on the rotating water-cooled roll such that the molten metal was subjected to rapid solidification. The width of the gap between the blade member and the water-cooled roll was 80 μm. The blade member was made of alumina.

Mechanical alloying (MA) processing was performed on the obtained thin metal strip to thereby produce a negative electrode active material.

[Mechanical Alloying (MA) Process]

The thin metal strips of the Test Nos. other than Test No. 22 were also subjected to mechanical alloying (MA) processing. Specifically, a thin metal strip, graphite powder (mean particle diameter of 5 μm in terms of median diameter D50), and PEG as an oxygen source were mixed at ratios shown in Condition 1 to Condition 10 described hereunder. Polyethylene glycol 20000 (reagent name) manufactured by Wako Pure Chemical Industries, Ltd. with an average molecular weight in a range of 15,000 to 25,000 was used as the PEG. The mixture was subjected to mechanical alloying (MA) processing using a high-speed planetary mill (trade name "High G BX", manufactured by Kurimoto Ltd.) in an argon gas atmosphere. The mechanical alloying (MA) processing of each Test No. was performed under the condition described in the "MG Condition" column shown in Table 6. The temperature of the chiller cooling water in the mechanical alloying (MA) processing was in the range of 1 to 25° C. for each of the MA conditions. In Test No. 22, mechanical alloying (MA) processing was not performed.

[MA Condition 1]
Centrifugal acceleration: 79 G (equivalent to rotational speed of 500 rpm)
Ball ratio: 15 (thin metal strip: balls=40 g: 600 g)
Thin metal strip: 89 mass %
Graphite powder: 6 mass %
PEG: 5 mass %
MA processing time period: 12 hours
Stopping time per 3 hours of MA processing: 30 minutes

[MA Condition 2]
Centrifugal acceleration: 79 G (equivalent to rotational speed of 500 rpm)
Ball ratio: 15 (thin metal strip: balls=40 g: 600 g)
Thin metal strip: 89 mass %
Graphite powder: 6 mass %
PEG: 5 mass %
MA processing time period: 0.5 hours

[MA Condition 3]
Centrifugal acceleration: 79 G (equivalent to rotational speed of 500 rpm)
Ball ratio: 2 (thin metal strip: balls=300 g: 600 g)
Thin metal strip: 89 mass %
Graphite powder: 6 mass %
PEG: 5 mass %
MA processing time period: 12 hours
Stopping time per 3 hours of MA processing: 30 minutes

[MA Condition 4]
Centrifugal acceleration: 79 G (equivalent to rotational speed of 500 rpm)
Ball ratio: 100 (thin metal strip: balls=6 g: 600 g)
Thin metal strip: 89 mass %
Graphite powder: 6 mass %
PEG: 5 mass %
MA processing time period: 12 hours
Stopping time per 3 hours of MA processing: 30 minutes

[MA Condition 5]
Centrifugal acceleration: 7 G (equivalent to rotational speed of 150 rpm)
Ball ratio: 15 (thin metal strip: balls=40 g: 600 g)
Thin metal strip: 89 mass %
Graphite powder: 6 mass %
PEG: 5 mass %
MA processing time period: 12 hours
Stopping time per 3 hours of MA processing: 30 minutes

[MA Condition 6]
Centrifugal acceleration: 79 G (equivalent to rotational speed of 500 rpm)
Ball ratio: 15 (thin metal strip: balls=40 g: 600 g)
Thin metal strip: 94 mass %
Graphite powder: 6 mass %
PEG: none
MA processing time period: 12 hours
Stopping time per 3 hours of MA processing: 30 minutes

[MA Condition 7]
Centrifugal acceleration: 79 G (equivalent to rotational speed of 500 rpm)
Ball ratio: 15 (thin metal strip: balls=40 g: 600 g)
Thin metal strip: 98.5 mass %
Graphite powder: 0.5 mass %
PEG: 1 mass %
MA processing time period: 12 hours
Stopping time per 3 hours of MA processing: 30 minutes

[MA Condition 8]
Centrifugal acceleration: 79 G (equivalent to rotational speed of 500 rpm)
Ball ratio: 15 (thin metal strip: balls=40 g: 600 g)
Thin metal strip: 87 mass %

Graphite powder: 6 mass %
PEG: 7 mass %
MA processing time period: 12 hours
Stopping time per 3 hours of MA processing: 30 minutes
[MA Condition 9]
Centrifugal acceleration: 79 G (equivalent to rotational speed of 500 rpm)
Ball ratio: 15 (thin metal strip: balls=40 g: 600 g)
Thin metal strip: 79 mass %
Graphite powder: 6 mass %
PEG: 15 mass %
MA processing time period: 12 hours
Stopping time per 3 hours of MA processing: 30 minutes
[MA Condition 10]
Centrifugal acceleration: 79 G (equivalent to rotational speed of 500 rpm)
Ball ratio: 6 (thin metal strip: balls=100 g: 600 g)
Thin metal strip: 89 mass %
Graphite powder: 6 mass %
PEG: 5 mass %
MA processing time period: 12 hours
Stopping time per 3 hours of MA processing: 30 minutes Negative electrode active materials were produced by the foregoing processes. In the negative electrode active materials, the mean particle diameter of the alloy particle was in the range of 0.5 to 50 μm.

[Measurement of Oxygen Content in Negative Electrode Active Material]

The oxygen content in the negative electrode active material of each Test No. was measured by the method described above. The results are shown in Table 6.

[Identification of Constituent Phases, and Measurement of Mean Particle Diameter of SiOx Phase (x=0.50 to 1.70)]

Samples for TEM observation were prepared in the manner described above using the produced negative electrode active materials. For each of the prepared samples for TEM observation, bright field images were photographed by the aforementioned method, an electron diffraction pattern based on micro regions was measured and analyzed, and EDS analysis was performed on the same regions as the regions at which the electron diffraction pattern was measured, to thereby identify the constituent phases. Further, the Si content of the $D0_3$ phase, the δ phase, the ε phase and the η' phase was calculated based on the result of EDS analysis of each phase. The x value of the SiOx phase was calculated based on the result of EDS analysis of the SiOx phase (x=0.50 to 1.70). The bright field images were subjected to image processing by the aforementioned method to thereby measure the mean particle diameter of the SiOx phase (x=0.50 to 1.70). The results are shown in Table 6.

[Measurement of Most Intense Diffraction Line Peak, Half-Width and Crystallite Diameter]

The produced negative electrode active materials were subjected to X-ray diffraction measurement under the aforementioned conditions, and measurement of the most intense diffraction line peak, half-width and crystallite diameter was performed.

Figure 21:
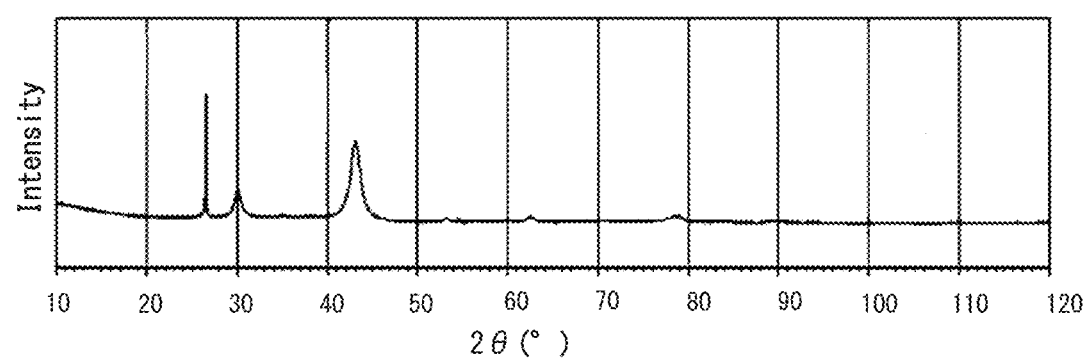
FIG. 21 is an X-ray diffraction profile of the negative electrode active material in Test No. 9A in the examples.

As one example, the measurement will be described using Test No. 9A. FIG. 21 is an X-ray diffraction profile of the negative electrode active material of Test No. 9A. Referring to FIG. 21, a diffraction line peak having the largest integrated diffraction intensity (most intense diffraction line peak) was present at 2θ=43.10 degrees. In FIG. 21, a peak appearing at 2θ=26.0 to 27.0 is a peak of graphite. Further, a half-width (Δ2θ=B (degrees)) of the most intense diffraction line peak was 1.24 degrees after correction of a value originating from the apparatus. In addition, the result obtained by determining the crystallite diameter by analysis using the aforementioned Scherrer equation was 7.5 nm. The most intense diffraction line peak, the half-width and the crystallite diameter were determined by a similar method for the negative electrode active materials of the other Test Nos. also. The results are shown in Table 6.

[Production of Negative Electrode for Coin Battery]

For each Test No., a negative electrode compound slurry containing the aforementioned negative electrode active material was produced. Specifically, the powdered negative electrode active material, acetylene black (AB) as a conductive additive, styrene-butadiene rubber (SBR) as a binder (2-fold dilution), and carboxymethyl cellulose (CMC: product No. 1160 manufactured by Daicel FineChem Ltd.) were mixed in a mass ratio of 75:15:10:5 (blending quantity was 1 g:0.2 g:0.134 g:0.067 g) to produce a mixture. Thereafter, a kneading machine was used to produce a negative electrode compound slurry by adding distilled water to the mixture such that the slurry density was 27.2%. Since the styrene-butadiene rubber was used by being diluted 2-fold with water, 0.134 g of styrene-butadiene rubber was blended when weighing.

The produced negative electrode compound slurry was applied onto a copper foil using an applicator (150 μm). The copper foil on which the slurry was applied was dried at 100° C. for 20 minutes. The copper foil after drying had a coating film composed of the negative electrode active material on the surface. The copper foil having the negative electrode active material film was subjected to punching to produce a disc-shaped copper foil having a diameter of 13 mm. The copper foil after punching was pressed at a press pressure of 500 kgf/cm² to produce a plate-shaped negative electrode.

[Production of Coin Battery]

The produced negative electrode, EC-DMC-EMC-VC-FEC as the electrolytic solution, a polyolefin separator (φ17 mm) as the separator, and a metal Li plate (φ19×1 mmt) as the positive electrode material were prepared. The thus-prepared negative electrode material, electrolytic solution, separator, and positive electrode material were used to produce a 2016 type coin battery. Assembly of the coin battery was performed within a glove box in argon atmosphere.

[Evaluation of Charge-Discharge Characteristics of Coin Battery]

The discharge capacity and capacity retention ratio of the battery of each Test No. were evaluated by the following method.

Constant current doping (corresponding to insertion of lithium ions into an electrode, and charging of a lithium ion secondary battery) was performed with respect to the coin battery at a current value of 0.1 mA (a current value of 0.075 mA/cm²) or a current value of 1.0 mA (a current value of 0.75 mA/cm²) until the potential difference with respect to the counter electrode became 0.005 V. Thereafter, the doping capacity was measured by continuing doping with respect to the counter electrode at a constant voltage until the current value became 7.5 μA/cm² while retaining 0.005 V.

Next, the de-doping capacity was measured by performing de-doping (corresponding to desorption of lithium ions from the electrode, and discharge of the lithium ion secondary battery) at a current value of 0.1 mA (a current value of 0.075 mA/cm²) or a current value of 1.0 mA (a current value of 0.75 mA/cm²) until the potential difference became 1.2 V.

The doping capacity and de-doping capacity correspond to charge capacity and discharge capacity when the electrode is used as the negative electrode of the lithium ion secondary battery. Therefore, the measured doping capacity was defined as "charge capacity" and the measured de-doping capacity was defined as "discharge capacity". Charging and discharging of the coin battery were repeated. The doping capacity and de-doping capacity were measured each time charging and discharging were performed in each cycle. The initial efficiency and capacity retention ratio were determined using the measurement result. Specifically, the initial efficiency was determined based on the charge capacity and the discharge capacity (mAh/g) for the first (initial) cycle. The initial efficiency is a numerical value shown as a percentage that was obtained by dividing the initial discharge capacity by the initial charge capacity. In addition, the capacity retention ratio after 100 cycles was determined. The capacity retention ratio is a numerical value shown as a percentage that was obtained by dividing the discharge capacity after 100 cycles by the initial discharge capacity.

The capacity of the coin battery was calculated as a value that was obtained by deducting the capacity of the conductive additive (acetylene black: AB), which is then divided by the fraction of negative electrode active material in the negative electrode compound to convert to the capacity of the elemental negative electrode active material. For example, in a case where the ratio in the negative electrode compound was negative electrode active material: conductive additive (AB):binder (SBR solid content):CMC=75:15:5:5, after converting the measured charge capacity or discharge capacity to a value per 1 g of the negative electrode compound, the capacitive component of acetylene black (25 mAh/g) was deducted, and the resulting value was multiplied by 6/5 to convert to the capacity of the elemental negative electrode active material based on the mixture ratio (negative electrode active material:AB+binder+CMC=75:25) and thereby calculate the capacity of the coin battery. The initial discharge capacity (mAh/g), initial efficiency (%) and capacity retention ratio (%) determined as described above are shown in Table 6.

[Measurement Results]

Referring to Table 6, the negative electrode active materials of Test Nos. 1 to 8, 9A to 9D, and 10 to 21 contained an alloy component of an appropriate composition and oxygen, and furthermore, the constituent phases, the Si contents of the $D0_3$ phase, the δ phase, the ε phase and the η' phase, the x value of SiOx, the most intense diffraction line peak and the half-width were appropriate. Therefore, with respect to the coin battery characteristics, the initial discharge capacity was higher than the theoretical capacity of graphite (372 mAh/g). In addition, the initial efficiency was 80% or more in each case. Further, the capacity retention ratio was 80% or more in each case.

In addition, in the negative electrode active materials of Test Nos. 1 to 8, 9A to 9C, and 10 to 21, the mean particle diameter of the SiOx phase (x=0.50 to 1.70) was 3 to 90 nm. Therefore, the capacity retention ratio was higher in comparison to Test No. 9D.

Note that, in each of the aforementioned Test Nos., the half-width and the position of the most intense diffraction line peak in the X-ray diffraction profile of the negative electrode active material in the battery before charging and in the battery after 10 cycles of discharging were substantially the same as the corresponding half-width and position of the most intense diffraction line peak in the negative electrode active material immediately after production. On the other hand, in the X-ray diffraction profile of the negative electrode active material in the battery after 10 cycles of charging, the most intense diffraction line peak was broad, and it was confirmed that the crystal structure of a constituent phase changed to become an occlusion phase.

In Test No. 9E, the MA processing time period was too short. As a result, the half-width was as narrow as 0.13, and the crystallite diameter of the alloy particle was too large. Further, the amount of Si detected in each of the $D0_3$ phase, the δ phase, the ε phase and the η' phase that were constituent phases was 5.0 at % or more. Consequently, an SiOx phase (x=0.50 to 1.70) was not formed. As a result, the initial discharge capacity among the coin battery characteristics was as low as 321.3 mAh/g.

In Test No. 9F, the ball ratio in the MA processing was too small. As a result, the half-width was as narrow as 0.14, and the crystallite diameter of the alloy particle was too large. Further, the amount of Si detected in each of the $D0_3$ phase, the δ phase, the ε phase and the η' phase that were constituent phases was 5.0 at % or more. Consequently, an SiOx phase (x=0.50 to 1.70) was not formed. As a result, the initial discharge capacity among the coin battery characteristics was as low as 311.0 mAh/g.

In Test No. 9G, the ball ratio in the MA processing was too large. As a result, the half-width was as wide as 3.64, and the crystallite diameter of the alloy particle was too small. Therefore, among the coin battery characteristics, the capacity retention ratio after 100 cycles of charging and discharging was as low as 24.9%.

In Test No. 9H, the centrifugal acceleration in the MA processing was too small. As a result, the half-width was as narrow as 0.13, and the crystallite diameter of the alloy particle was too large. Further, the amount of Si detected in each of the $D0_3$ phase, the δ phase, the ε phase and the η' phase that were constituent phases was 5.0 at % or more. Consequently, an SiOx phase (x=0.50 to 1.70) was not formed. As a result, the initial discharge initial capacity among the coin battery characteristics was as low as 300.9 mAh/g.

In Test No. 9I, because an oxygen source was not added when performing MA processing, the oxygen content of the negative electrode active material was too low. Because there was no oxygen source when performing MA processing, an SiOx phase (x=0.50 to 1.70) was not formed in the negative electrode active material of Test No. 9I. Consequently, the amount of Si detected in each of the $D0_3$ phase, the δ phase, the ε phase and the η' phase that were constituent phases was 5.0 at % or more. As a result, among the coin battery characteristics, the initial discharge capacity was as low as 311.0 mAh/g.

In Test No. 9J, because the added amount of PEG when performing MA processing was too large, the oxygen content of the negative electrode active material was too high. Therefore, the x value of the SiOx phase (x=0.50 to 1.70) was 1.74. As a result, among the coin battery characteristics, the capacity retention ratio after 100 cycles of charging and discharging was as low as 40.5%.

In Test No. 22, a powder reagent of pure Si as a negative electrode active material was pulverized using an automatic mortar and used. As a result, the capacity retention ratio after 100 cycles of charging and discharging was as low as 10.2%.

In Test Nos. 23 to 30, the chemical composition was not appropriate. Therefore, the alloy particles of these Test Nos. did not have an appropriate combination of constituent phases.

Specifically, in Test No. 23, neither the $D0_3$ phase nor the δ phase was formed. As a result, among the coin battery characteristics, the capacity retention ratio after 100 cycles of charging and discharging was as low as 48.7%.

In Test No. 24, neither the D0₃ phase nor the δ phase was formed. As a result, among the coin battery characteristics, the capacity retention ratio after 100 cycles of charging and discharging was as low as 22.2%.

In Test No. 25, neither the ε phase nor the η' phase was formed. As a result, among the coin battery characteristics, the initial discharge capacity was as low as 300.7 mAh/g.

In Test No. 26, the D0₃ phase, the δ phase, the ε phase, the η' phase and the SiOx phase (x=0.50 to 1.70) were not formed. As a result, among the coin battery characteristics, the initial discharge capacity was as low as 25.2 mAh/g.

In Test No. 27, neither the ε phase nor the η' phase was formed. As a result, among the coin battery characteristics, the initial discharge capacity was as low as 66.9 mAh/g.

In Test No. 28, neither the ε phase nor the η' phase was formed. As a result, among the coin battery characteristics, the initial discharge capacity was as low as 55.7 mAh/g.

In Test No. 29, neither the D0₃ phase nor the δ phase was formed. As a result, among the coin battery characteristics, the capacity retention ratio after 100 cycles of charging and discharging was as low as 19.7%.

In Test No. 30, the ε phase, the η' phase and the SiOx phase (x=0.50 to 1.70) were not formed. As a result, among the coin battery characteristics, the initial discharge capacity was as low as 171.6 mAh/g.

An embodiment of the present invention has been described above. However, the foregoing embodiment is merely an example for implementing the present invention. Accordingly, the present invention is not limited to the above embodiment, and the above embodiment can be appropriately modified within a range that does not deviate from the gist of the present invention.

REFERENCE SIGNS LIST

1 δ phase
2 SiOx phase
3 ε phase
4 η' phase
5 D0₃ phase

The invention claimed is:

1. A negative electrode active material comprising an alloy particle, the alloy particle containing:
an alloy component containing, in atomic composition percentage excluding oxygen, Sn: 13.0 to 40.0 at % and Si: 6.0 to 40.0 at %, with the balance being Cu and impurities, and
oxygen in an amount in a range of 0.50 to 3.00 mass %; wherein:
the alloy particle contains:
one type or two types of phase selected from a group consisting of a phase having a D0₃ structure in Strukturbericht notation in which an Si content is in a range of 0 to 5.0 at % and a δ phase in which an Si content is in a range of 0 to 5.0 at %,
one type or two types of phase selected from a group consisting of an ε phase in which an Si content is in a range of 0 to 5.0 at % and an η' phase in which an Si content is in a range of 0 to 5.0 at %, and
an SiOx phase (x=0.50 to 1.70); and
the alloy particle has, in an X-ray diffraction profile, a peak having a largest integrated diffraction intensity in a range of 42.0 to 44.0 degrees of a diffraction angle 2θ, with a half-width of the peak being in a range of 0.15 to 2.50 degrees.

2. The negative electrode active material according to claim 1, wherein
a mean particle diameter of the SiOx phase (x=0.50 to 1.70) is in a range of 3.0 to 90.0 nm in equivalent circular diameter.

3. The negative electrode active material according to claim 1, wherein the alloy component further contains, in place of a part of Cu:
one or more elements selected from a group consisting of Ti, V, Cr, Mn, Fe, Co, Ni, Zn, Al, B and C.

4. The negative electrode active material according to claim 2, wherein the alloy component further contains, in place of a part of Cu:
one or more elements selected from a group consisting of Ti, V, Cr, Mn, Fe, Co, Ni, Zn, Al, B and C.

5. The negative electrode active material according to claim 3, wherein the alloy component contains one or more elements selected from a group consisting of:
Ti: 2.00 at % or less,
V: 2.00 at % or less,
Cr: 2.00 at % or less,
Mn: 2.00 at % or less,
Fe: 2.00 at % or less,
Co: 2.00 at % or less,
Ni: 3.00 at % or less,
Zn: 3.00 at % or less,
Al: 3.00 at % or less,
B: 2.00 at % or less, and
C: 2.00 at % or less.

6. The negative electrode active material according to claim 4, wherein the alloy component contains one or more elements selected from a group consisting of:
Ti: 2.00 at % or less,
V: 2.00 at % or less,
Cr: 2.00 at % or less,
Mn: 2.00 at % or less,
Fe: 2.00 at % or less,
Co: 2.00 at % or less,
Ni: 3.00 at % or less,
Zn: 3.00 at % or less,
Al: 3.00 at % or less,
B: 2.00 at % or less, and
C: 2.00 at % or less.

7. A negative electrode that comprises the negative electrode active material according to any one of claim 1.

8. A negative electrode that comprises the negative electrode active material according to any one of claim 2.

9. A negative electrode that comprises the negative electrode active material according to any one of claim 3.

10. A negative electrode that comprises the negative electrode active material according to any one of claim 4.

11. A negative electrode that comprises the negative electrode active material according to any one of claim 5.

12. A negative electrode that comprises the negative electrode active material according to any one of claim 6.

13. A battery that comprises the negative electrode according to claim 7.

14. A battery that comprises the negative electrode according to claim 8.

15. A battery that comprises the negative electrode according to claim 9.

16. A battery that comprises the negative electrode according to claim 10.

17. A battery that comprises the negative electrode according to claim 11.

18. A battery that comprises the negative electrode according to claim 12.

* * * * *